US012717807B2

(12) United States Patent
Yamanaka et al.

(10) Patent No.: US 12,717,807 B2
(45) Date of Patent: Aug. 25, 2026

(54) ENGINEERING DEVICE THAT STORES A VIRTUAL DATA FORMAT USED BY A MODULE IN WHICH DEFINITION DATA DEFINES A MODULE THAT IS CONTROLLED BY A CONTROL SYSTEM

(71) Applicant: MITSUBISHI HEAVY INDUSTRIES, LTD., Tokyo (JP)

(72) Inventors: Yoshikane Yamanaka, Tokyo (JP); Shinichi Toda, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/901,967

(22) Filed: Sep. 30, 2024

(65) Prior Publication Data

US 2025/0110966 A1 Apr. 3, 2025

(30) Foreign Application Priority Data

Oct. 2, 2023 (JP) ................................ 2023-171343

(51) Int. Cl.
*G06F 16/25* (2019.01)

(52) U.S. Cl.
CPC .................................. *G06F 16/258* (2019.01)

(58) Field of Classification Search
CPC ..................................................... G06F 16/258
See application file for complete search history.

(56) References Cited

U.S. PATENT DOCUMENTS 6,697,879 B1 * 2/2004 Tufty ..................... G06Q 10/00 709/201
8,643,893 B2 * 2/2014 Mori ...................... G06F 21/57 358/1.9
2017/0308448 A1 * 10/2017 Sato ...................... G06F 3/0637
2018/0074099 A1 * 3/2018 Takata .............. G06F 16/90335
2019/0231625 A1 * 8/2019 Nishikado ........... A61B 5/7282
2021/0026864 A1 * 1/2021 Kamiguchi ............ H04L 67/34

FOREIGN PATENT DOCUMENTS

JP 2013-142933 7/2013
JP 2013142933 A * 7/2013

* cited by examiner

*Primary Examiner* — Cheyne D Ly
(74) *Attorney, Agent, or Firm* — Wenderoth, Lind & Ponack, L.L.P.

(57) ABSTRACT

There are provided an engineering device includes: a storage unit configured to store a virtual data format which is commonly used by a first type of module in which definition data for defining a module installed in a control system is provided as data of a predetermined common format; and an object data generating unit configured to secure a storage area in which details of the virtual data format are reflected in the storage unit on the basis of the virtual data format when an installed module is the first type of module, to write entries indicated by the definition data according to the data format indicated by the definition data of the installed module to the secured storage area, and to write a module name of the installed module to the secured storage area to generate object data.

9 Claims, 13 Drawing Sheets

[INDIVIDUAL CLASS] 30-1

| | |
|---|---|
| CLASS ID | MANUFACTURED BY COMPANY A AI-01 |
| CLASS NAME | MANUFACTURED BY COMPANY A AI-01 AI ch.8 4-20mA |
| PROPERTY | |
| FAIL ACTION | (DATA TYPE) |
| COMMUNICATION Timeout TIME(ms) | (DATA TYPE) |
| SIGNAL RANGE UPPER LIMIT(mA) | (DATA TYPE) |
| SIGNAL RANGE LOWER LIMIT(mA) | (DATA TYPE) |
| INSTALLATION LOCATION | |
| Net | (DATA TYPE) |
| Node | (DATA TYPE) |
| Slot | (DATA TYPE) |

REPETITION BY 8 ch (b)

[OBJECT DATA (FOR PRESSURE SENSOR)]

30-1-1

| | | |
|---|---|---|
| CLASS ID | MANUFACTURED BY COMPANY A AI-01 | |
| CLASS NAME | MANUFACTURED BY COMPANY A AI-01 AI ch.8 4-20mA | |
| PROPERTY | | |
| FAIL ACTION | (DATA TYPE) | INPUT OF 0 |
| COMMUNICATION Timeout TIME(ms) | (DATA TYPE) | 30 |
| SIGNAL RANGE UPPER LIMIT(mA) | (DATA TYPE) | 20 |
| SIGNAL RANGE LOWER LIMIT(mA) | (DATA TYPE) | 4 |
| INSTALLATION LOCATION | | |
| Net | (DATA TYPE) | 1 |
| Node | (DATA TYPE) | 32 |
| Slot | (DATA TYPE) | 1 |

(c)

[OBJECT DATA (FOR TEMPERATURE SENSOR)]

30-1-2

| | | |
|---|---|---|
| CLASS ID | MANUFACTURED BY COMPANY A AI-01 | |
| CLASS NAME | MANUFACTURED BY COMPANY A AI-01 AI ch.8 4-20mA | |
| PROPERTY | | |
| FAIL ACTION | (DATA TYPE) | KEEP |
| COMMUNICATION Timeout TIME(ms) | (DATA TYPE) | 30 |
| SIGNAL RANGE UPPER LIMIT(mA) | (DATA TYPE) | 20 |
| SIGNAL RANGE LOWER LIMIT(mA) | (DATA TYPE) | 4 |
| INSTALLATION LOCATION | | |
| Net | (DATA TYPE) | 1 |
| Node | (DATA TYPE) | 32 |
| Slot | (DATA TYPE) | 5 |

| | | |
|---|---|---|
| CLASS ID | VIRTUAL CLASS | |
| CLASS NAME | VIRTUAL CLASS INITIAL NAME | |
| PROPERTY | | |
| | | |
| | | |
| | | |
| | | |
| | | |
| ⋮ | | |
| INSTALLATION LOCATION | | |
| Net | (DATA TYPE) | |
| Node | (DATA TYPE) | |
| Slot | (DATA TYPE) | |

| VIRTUAL CLASS-USED MODULE NAME TABLE |
|---|
| MANUFACTURED BY COMPANY B AI AI ch. 16 4-20mA |
| MANUFACTURED BY COMPANY B AO AI ch.16 1-5VDC |
| ⋮ |

| FILE NAME | MANUFACTURED BY COMPANY B AI AI ch.16 4-20mA |
|---|---|

Timeout(ms),(DATA TYPE),Fail action,(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),
SIGNAL RANGE UPPER LIMIT(mA),(DATA TYPE),SIGNAL RANGE LOWER LIMIT(mA),(DATA TYPE),COMMUNICATION DATA UPPER LIMIT(byte),(DATA TYPE),COMMUNICATION DATA LOWER LIMIT(byte),(DATA TYPE),

| | | |
|---|---|---|
| CLASS ID | VIRTUAL CLASS | |
| CLASS NAME | MANUFACTURED BY COMPANY B AI AI ch.16 4-20mA | |
| PROPERTY | | |
| Timeout(ms) | (DATA TYPE) | 30 |
| Fail action | (DATA TYPE) | 0 INPUT |
| SIGNAL RANGE UPPER LIMIT(mA) | (DATA TYPE) | 20 |
| SIGNAL RANGE LOWER LIMIT(mA) | (DATA TYPE) | 4 |
| COMMUNICATION DATA UPPER LIMIT(byte) | (DATA TYPE) | 10000 |
| COMMUNICATION DATA LOWER LIMIT(byte) | (DATA TYPE) | 0 |
| ⋮ | | |
| INSTALLATION LOCATION | | |
| Net | (DATA TYPE) | 1 |
| Node | (DATA TYPE) | 32 |
| Slot | (DATA TYPE) | 3 |

ENTRIES AND PROPERTY DATA CORRESPONDING TO 16 ch

ENGINEERING DEVICE THAT STORES A VIRTUAL DATA FORMAT USED BY A MODULE IN WHICH DEFINITION DATA DEFINES A MODULE THAT IS CONTROLLED BY A CONTROL SYSTEM

TECHNICAL FIELD

The present disclosure relates to an engineering device, an object data generation method, and a non-transitory computer-readable recording medium. Priority is claimed on Japanese Patent Application No. 2023-171343, filed Oct. 2, 2023, the content of which is incorporated herein by reference.

BACKGROUND ART

For example, many modules such as input/output (IO) modules connected to field devices such as sensors or actuators in a plant are installed in a control system used for control of the plant. In order to operate these modules normally, it is necessary to set installation location data indicating positions at which individual modules are installed or property data indicating operation states of the individual modules for the control system. Here, property data is, for example, parameters for determining the behavior of an IO module when a module is an IO module. For example, an engineering device is used to set the installation location data or the property data for the control system (for example, see Patent Literature 1).

For example, installation location data or property data of a module to be newly added is set for a control system using an engineering device as follows. The engineering device includes a database storing data on a latest system configuration of a control system. The engineering device displays an image in which the system configuration of the control system is represented by a tree structure on a screen on the basis of data stored in the database. In this tree structure, a subnode is added to a part corresponding to a position at which a module to be newly added is installed. Installation location data of the module to be newly added is generated according to the position of the added subnode.

Then, a data format including predetermined entries is selected according to functions or specifications of the module to be newly added and allocated to the added subnode. Property data is set for each of the entries in the allocated data format. Accordingly, when data stored in the database of the engineering device is updated, updated details of the database are reflected in data on the system configuration of the control system. As a result, the newly added module can operate normally in the control system.

CITATION LIST

Patent Literature

Patent Literature 1

Japanese Unexamined Patent Application, First Publication No. 2013-142933

SUMMARY

The aforementioned data format is a format which varies depending on types of modules. In the engineering device, in order to enable the engineering device to select a data format corresponding to a certain module, it is necessary to acquire definition data for defining the data format in advance and to construct the data format in the database in advance on the basis of the acquired definition data. Since the data format indicated by the definition data generally has a complex hierarchical structure, certain human and temporal costs are required for constructing the data format in the database.

When a timing at which definition data can be acquired is before a timing of product shipment, construction of a data format of a module in which a time difference between the two timings is sufficiently large in the database can be completed by when shipment of the module is started. On the other hand, a data format of a module in which a time difference between the two timings is small often cannot constructed in the database by the timing of product shipment. When many modules in which a time difference between the two timings is sufficiently large come to the market in a short time, data formats of some modules are not often constructed in the database at the timing of product shipment.

When a data format is not constructed in the database, the engineering device cannot select the data format corresponding to the module, and thus there is a problem in that the module cannot be installed and used in the control system.

The present disclosure was made to solve the aforementioned problem, and an objective thereof is to provide an engineering device, an object data generation method, and a non-transitory computer-readable recording medium that can shorten a period of time from a time point at which definition data is acquired to a time point at which a module corresponding to the definition data can be used in a control system.

In order to achieve the aforementioned objective, an engineering device according to the present disclosure includes: a storage unit configured to store a virtual data format which is commonly used by a first type of module in which definition data for defining a module installed in a control system is provided as data of a predetermined common format; and an object data generating unit configured to secure a storage area in which details of the virtual data format are reflected in the storage unit on the basis of the virtual data format when an installed module is the first type of module, to write entries indicated by the definition data according to the data format indicated by the definition data of the installed module to the secured storage area, and to write a module name of the installed module to the secured storage area to generate object data.

An object data generation method according to the present disclosure includes: a step of storing a virtual data format which is commonly used by a first type of module in which definition data for defining a module installed in a control system is provided as data of a predetermined common format in a storage unit; and a step of securing a storage area in which details of the virtual data format are reflected in the storage unit on the basis of the virtual data format when an installed module is the first type of module, writing entries indicated by the definition data according to the data format indicated by the definition data of the installed module to the secured storage area, and writing a module name of the installed module to the secured storage area to generate object data.

A non-transitory computer-readable recording medium storing a program according to the present disclosure causes a computer to perform: a step of storing a virtual data format which is commonly used by a first type of module in which definition data for defining a module installed in a control system is provided as data of a predetermined common format in a storage unit; and a step of securing a storage area in which details of the virtual data format are reflected in the storage unit on the basis of the virtual data format when an installed module is the first type of module, writing entries indicated by the definition data according to the data format indicated by the definition data of the installed module to the secured storage area, and writing a module name of the installed module to the secured storage area to generate object data.

With the engineering device, the object data generation method, and the non-transitory computer-readable recording medium according to the present disclosure, it is possible to shorten a period of time from a time point at which definition data is acquired to a time point at which a module corresponding to the definition data can be used in a control system.

BRIEF DESCRIPTION OF DRAWINGS

FIG. 3 is a diagram illustrating an example of an individual class and object data that is generated from the individual class according to an embodiment of the present disclosure.

FIG. 4 is a diagram illustrating an example of a virtual class according to an embodiment of the present disclosure.

FIG. 5 is a diagram illustrating an example of a table configuration of a virtual class-used module name table according to an embodiment of the present disclosure.

FIG. 6 is a diagram illustrating an example of definition data of an exceptional IO module according to an embodiment of the present disclosure.

FIG. 12 is a diagram illustrating an example of object data that is generated from a virtual class according to an embodiment of the present disclosure.

DESCRIPTION OF EMBODIMENTS

Figure 1:
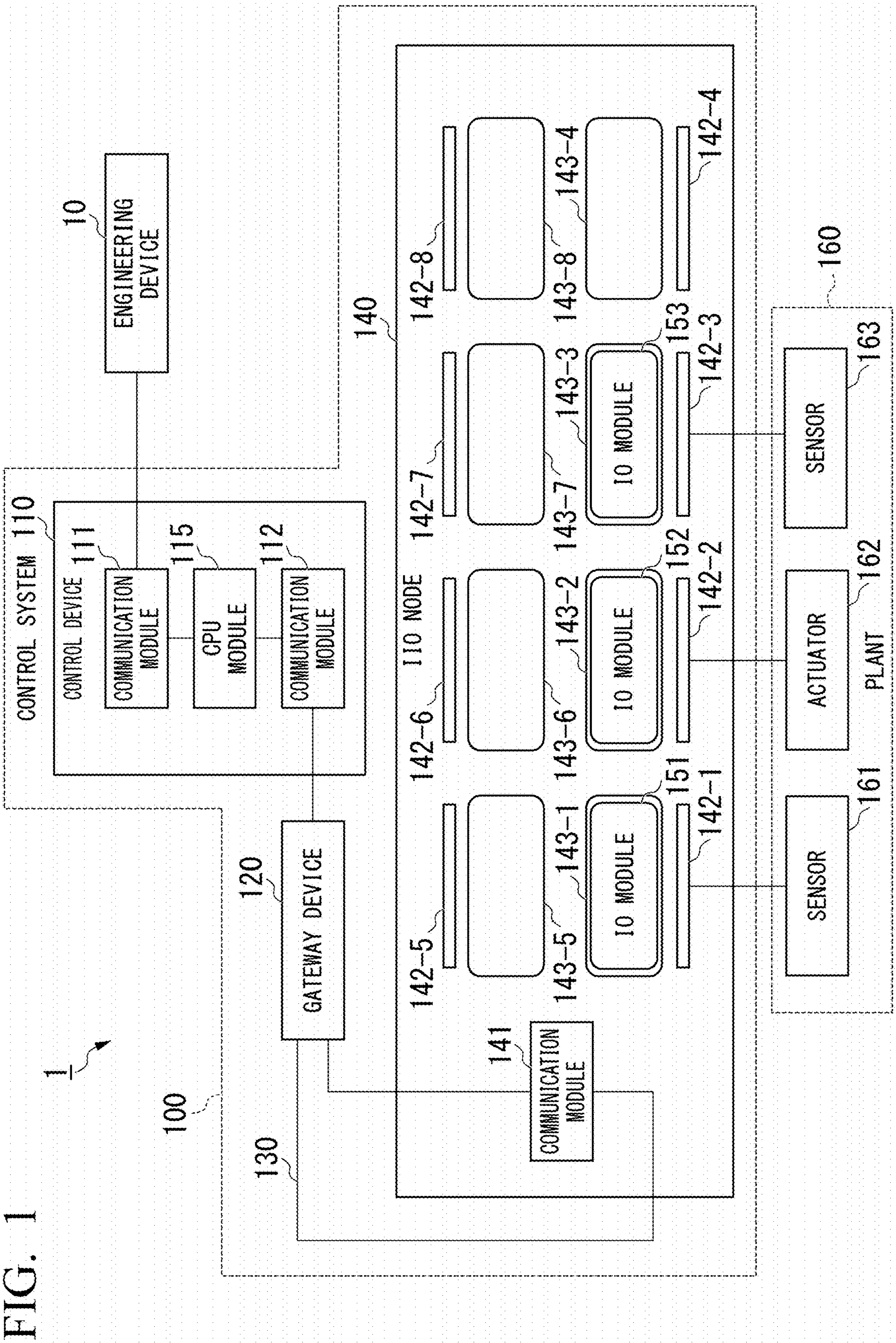
FIG. 1 is a block diagram illustrating an example of a configuration of a plant system according to an embodiment of the present disclosure.

Hereinafter, an engineering device, an object data generation method, and a non-transitory computer-readable recording medium according to an embodiment of the present disclosure will be described with reference to the accompanying drawings. The same or corresponding elements in the drawings will be referred to by the same reference signs, and description thereof will be appropriately omitted.

(Entire Configuration)

FIG. 1 is a block diagram illustrating an example of an entire configuration of a plant system 1. The plant system 1 includes a plant 160, a control system 100, and an engineering device 10. The plant 160 is, for example, a power plant or a factory, and sensors 161 and 163 and an actuator 162 which are field devices included in the plant 160 are illustrated in FIG. 1. The sensors 161 and 163 measure, for example, temperatures or pressures of pipes provided in the plant 160. For example, the actuator 162 opens or closes a valve that is inserted into a pipe provided in the plant.

The control system 100 includes a control device 110, a gateway device 120, a ring network 130, and an IO node 140. The control device 110 includes communication modules 111 and 112 and a central processing unit (CPU) module 115. The communication module 111 is connected to the engineering device 10, for example, via a local area network (LAN) or the like and transmits and receives data to and from the engineering device 10. The communication module 112 is connected to the gateway device 120 via a communication cable and transmits and receives data to and from the gateway device 120. The CPU module 115 is a control microcomputer including, for example, a CPU, a random access memory (RAM), and a read only memory (ROM) and is connected to the communication modules 111 and 112. The CPU module 115 performs an operation of calculating an amount of drive of the actuator 162 or the like, for example, on the basis of numerical values indicating temperatures or pressures measured by the sensors 161 and 163.

The gateway device 120 performs a protocol converting process of converting one protocol to another protocol out of a protocol applied to communication with the communication module 112 and a protocol applied to the ring network 130. The gateway device 120 relays data transmitted and received between the IO node 140 and the control device 110 by performing the protocol converting process.

The ring network 130 is a communication network employing a ring-shaped connection form. In FIG. 1, for example, a connection form between the gateway device 120 and one IO node 140 is illustrated, and, for example, a plurality of IO nodes 140 can also be connected to the ring network 130. In this case, the control device 110 and the plurality of IO nodes 140 transmit and receive data via the ring network 130 and the gateway device 120.

The IO node 140 includes a communication module 141, interfaces 142-1 to 142-8, and slots 143-1 to 143-8. The communication module 141 is connected to the ring network 130 and transmits and receives data to and from the control device 110 via the ring network 130 and the gateway device 120.

Various field devices such as the sensors 161 and 163 and the actuator 162 are connected to the interfaces 142-1 to 142-8 via communication cables. The slots 143-1 to 143-8 are configured to allow insertion and detachment of various IO modules such as IO modules 151, 152, and 153 thereinto and therefrom. In FIG. 1, a configuration example in which the IO module 151 is inserted into the slot 143-1, the IO module 152 is inserted into the slot 143-2, the IO module 153 is inserted into the slot 143-3, and the other slots 143-4 to 143-8 are empty is illustrated.

The interfaces 142-1 to 142-8 are provided to correspond to the slots 143-1 to 143-8, respectively, such that subnumbers of the reference signs match. In FIG. 1, for example, the number of interfaces 142-1 to 142-8 and the number of slots 143-1 to 143-8 are 8, but may be less than 8 or equal to or greater than 8.

Lines electrically connecting the interfaces 142-1 to 142-8 and the slots 143-1 to 143-8 corresponding to each other are provided on the rear surface of the IO node 140. Lines electrically connecting the slots 143-1 to 143-8 to the communication module 141 are provided on the rear surface of the IO node 140. Accordingly, for example, when the IO module 151 is inserted into the slot 143-1, the IO module 151 and the sensor 161 are connected via the interface 142-1, and the IO module 151 and the communication module 141 are connected.

In the following description, an arbitrary one of various IO modules including the IO modules 151, 152, and 153 is referred to as an IO module 150. The IO module 150 includes various types. For example, the IO module 151 acquires an analog current signal output from the sensor 161, converts the acquired analog current signal to a digital signal, and transmits the digital signal to the CPU module 115 via the communication module 141. The IO module 152 receives the digital signal transmitted from the CPU module 115 via the communication module 141, converts the received digital signal to an analog current signal, and outputs the analog current signal to the actuator 162. The IO module 150 includes an IO module that acquires an analog current signal, converts the analog current signal to a digital signal, and outputs the digital signal similarly to the IO module 151, but that can acquire an analog current signal in a range of a current value different from the IO module 151.

As in the IO module 151 and the IO module 152, there is a type difference in different manufacturers in addition to a type difference in different functions or a type difference in different specifications such as current value ranges which can be acquired. For example, it is assumed that the IO modules 151 and 152 are IO modules manufactured by company A and the IO module 153 is an IO module manufactured by company B different from company A. In this case, even when the IO module 153 has the same function and specifications as the IO module 151, the manufacturers thereof are different, and thus the IO module 151 and the IO module 153 are IO modules of different types.

(Configuration of Engineering Device)

Figure 2:
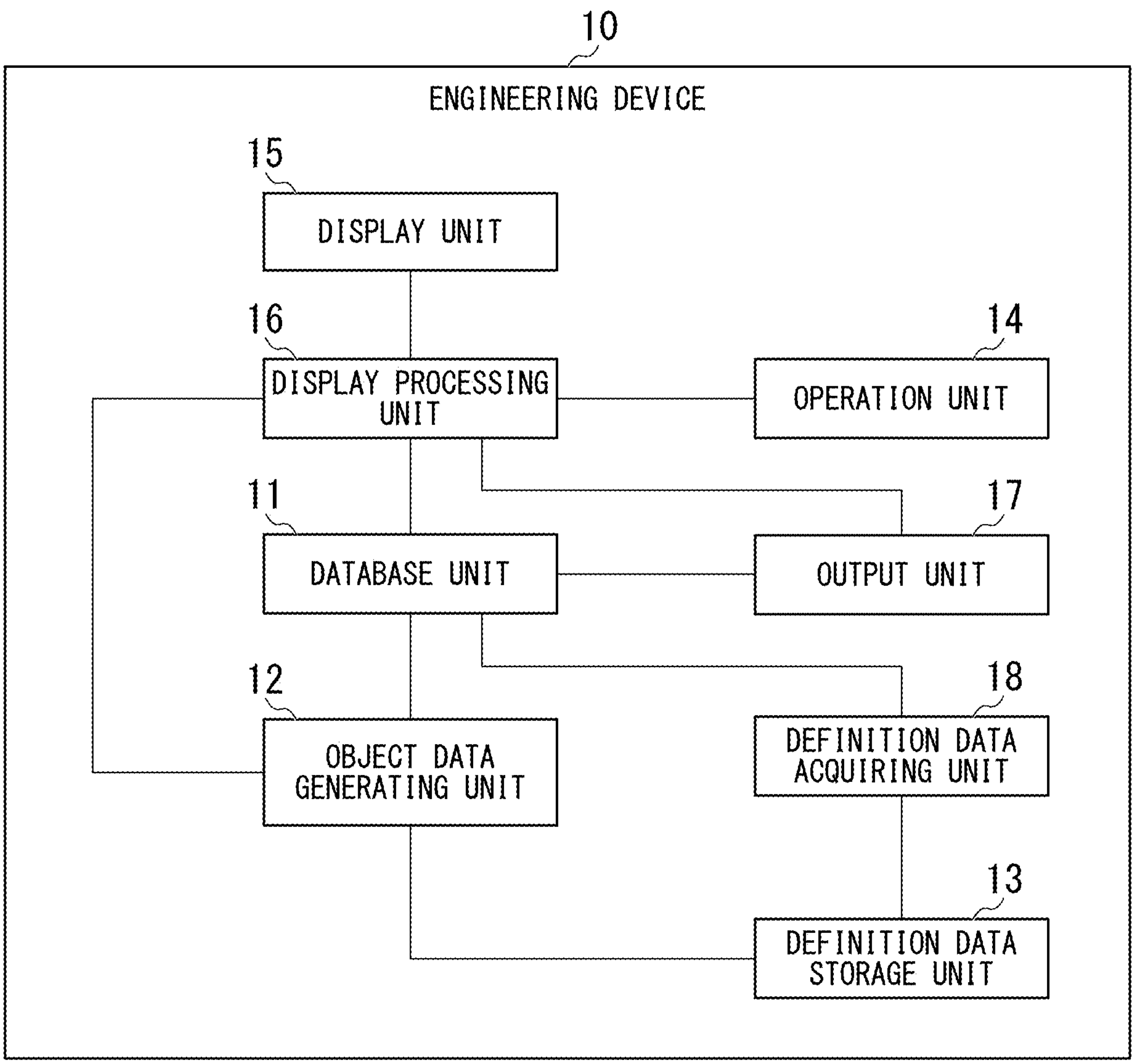
FIG. 2 is a block diagram illustrating an example of a configuration of an engineering device according to an embodiment of the present disclosure.

FIG. 2 is a block diagram illustrating an example of a configuration of the engineering device 10. The engineering device 10 can be constituted, for example, by a computer such as a server, a personal computer, or a microcomputer, a peripheral of the computer, and the like and includes a database unit 11, an object data generating unit 12, a definition data storage unit 13, an operation unit 14, a display unit 15, a display processing unit 16, an output unit 17, and a definition data acquiring unit 18 as functional units which are realized by a combination of hardware of the computer or the like and software such as a program executed by the computer.

The database unit 11 is, for example, a storage medium in which a database such as RDB is constructed and is configured to enable recording of data or retrieval of data through an access from the outside using database language such as structured query language (SQL). The database unit 11 stores system configuration data indicating the system configuration of the control system 100. In the database unit 11, data formats used for definition of the IO modules 150 installed in the control system 100 are constructed.

In order to operate the IO module 150 normally, it is necessary to record installation location data indicating a location at which the IO module 150 is installed in the control system 100 and property data for determining an operation state of the IO module 150 to the database unit 11 as a part of system configuration data of the control system 100. It is also necessary to enable retrieval of the data in addition to recording on the database unit 11. Accordingly, in the database unit 11, it is necessary to generate a table in which installation location data and property data are stored, to determine entries serving as retrieval indices in the generated table, and to determine a type of data (hereinafter referred to as a data type) recorded to correspond to the entries. Here, a data type is, for example, information indicating a type of data to be recorded such as a character type or an integer type and a size of data to be recorded.

That is, a data format used for definition of an IO module 150 constructed in the database unit 11 includes a structure of a table, entries included in the table, and data types corresponding to the entries. Hereinafter, this data format is referred to as a class.

Since a data format of property data differs depending on the types of the IO modules 150, a class is determined for each type of the IO modules 150. Definition data provided by manufacturers of the IO modules 150 is used to determine the class.

A timing at which definition data is provided varies. Definition data may be provided before a timing of product shipment, or definition data may be provided at the timing of product shipment. Here, it is assumed that an operator of the control system 100 employs an IO module 150 manufactured by company A as an IO module which is normally used (hereinafter referred to as a normal IO module). It is assumed that the operator and company A arrange provision of definition data from company A to the operator in a predetermined period before a timing at which company A ships a normal IO module. Here, it is assumed that the predetermined period is a period with a sufficient margin for constructing a class in the database unit 11 on the basis of definition data.

On the other hand, it is assumed that the operator determines an IO module 150 manufactured by company B as an IO module which is exceptionally used (hereinafter referred to as an exceptional IO module). It is assumed that the operator and company B do not have the same as the arrangement with company A, it is not clear whether definition data of the exceptional IO module manufactured by company B can be acquired before the timing of product shipment, and the operator acquires the definition data at the timing of product shipment at the latest. Company A may be a company to which the operator belongs. In this case, company A is the operator's own company, and company B is another company in view of the operator.

Due to a difference in acquisition timing of definition data between the normal IO module and the exceptional IO module, the following difference is present in a class constructed in the database unit 11 between the normal IO module and the exceptional IO module. In the following description, for example, it is assumed that the IO modules 151 and 152 are IO modules manufactured by company A and the IO module 153 is an IO module manufactured by company B.

(Class of Normal IO Module)

Regarding normal IO modules manufactured by company A, individual classes (hereinafter referred to as individual classes) are constructed in the database unit 11 on the basis of definition data of the normal IO Modules before the timing of shipment of the normal IO modules.

FIG. 3(*a*) is a diagram illustrating an example of a configuration of an individual class 30-1 of the IO module 151 which is a normal IO module. The individual class 30-1 includes entries of "class ID (Identification)," "class name," "property," and "installation location." A module name of the IO module 151 is written to a section in which data of the entry "class name" is recorded in the second row. In FIG. 3(*a*), "AI-01 AI ch. 8 4-20 mA manufactured by company A" is written as the module name of the IO module 151. Here, "AI" is an abbreviation to analog input. "01" denotes a number given to vary depending on the AI type of IO modules 150 manufactured by company A. "ch. 8" denotes that the number of channels of the IO module 151 is 8. "4-20 mA" denotes that a range of an analog current value which can be acquired by the IO module 151 ranges from 4 mA to 20 mA.

A class ID for identifying a class is written to a section in which data of the entry "class ID" is recorded in the first row. In the example illustrated in FIG. 3(*a*), "AI-01 manufactured by company A" which is a part of the module name is written as the class ID.

The entry "property" includes entries of "fail action," "communication Timeout time (ms (milli second))," "signal range upper limit "mA (milli ampere)," and "signal range lower limit (mA)" as subentries and additionally includes data types corresponding to the subentries. In FIG. 3(*a*), the entries "signal range upper limit (mA)" and "signal range lower limit (mA)" corresponding to only one channel are illustrated, but the IO module 151 actually includes 8 channels. Accordingly, the entries "signal range upper limit (mA)" and "signal range lower limit (mA)" corresponding to 8 channels and data types corresponding to the entries are included in the individual class 30-1. In FIG. 3(*a*) and other drawings, any specific data type is not illustrated, but "(data type)" is described, but details such as "character type" or "integer type" which is a data type corresponding to each entry are described in the parts of "(data type)."

The entry "installation location" includes entries of "Het," "Node," and "Slot" as subentries and additionally includes data types corresponding to the subentries. Here, data corresponding to the entry "Net" is identification data for identifying one ring network 130 provided for each CPU module 115. Data corresponding to the entry "Node" is identification data for identifying the IO node 140 connected to the ring network 130 indicated by the entry "Net." Data corresponding to the entry "Slot" is identification data indicating which of the slots 143-1 to 143-8 of the IO node 140 indicated by the entry "Node" the IO module 151 is inserted into.

Out of details included in the individual class 30-1, details acquired from the definition data of the IO module 151 are a module name written to a section in which data of the entry "class name" is recorded, "fail action," "communication Timeout time (ms)" which are subentries of the entry "property," names of the entries of "signal range upper limit (mA)" and "signal range lower limit (mA)" corresponding to 8 channels, and data types of subentries of the entry "property."

In the example illustrated in FIG. 3(*a*), the class ID which is written to the section in which data of the entry "class ID" is recorded is a part of the module name of the IO module 151. Accordingly, in this case, the class ID is data which is acquired from definition data. Here, the class ID may employ any information as long as it is information for identifying each class, and the class ID is not acquired from definition data unless a part of the module name is used as the class ID. Regarding the module name which is written to the section in which data of the entry "class name" is recorded, the module name provided in definition data by company A is not used without any change, but may be changed to an arbitrary module name. When the module name is changed, this module name is also not acquired from definition data.

The entry "installation location" is not data acquired from definition data, but is an entry which is predetermined according to the configuration of the control system 100 and is an entry in the data format common to all the classes. Accordingly, when the operator of the engineering device 10 constructs the individual class 30-1 in the database unit 11, a part of the entry "installation entry" is constructed according to definition of predetermined subentries of the entry "installation location and data types of the subentries.

The data format of the entry "property" of the individual class 30-1 illustrated in FIG. 3(*a*) is presented as an example. In general, regardless of a normal IO module or an exceptional IO module, the data format indicated by definition data of each IO module 150 is not a simple data format which can be represented in one table like the entry "property" illustrated in FIG. 3(*a*), but may be a data format with a complex hierarchical structure in which a plurality of tables are combined. In the following description, an individual class corresponding to an arbitrary one of the normal ID modules is referred to as an individual class 30.

(Class of Exceptional IO Module)

As described above, it is not clear whether definition data of the exceptional IO module manufactured by company B can be acquired before product shipment. Accordingly, individual classes corresponding to the exceptional IO modules are not constructed in the database unit 11, and a virtual class which is commonly used by the exceptional IO modules is constructed.

FIG. 4 is a diagram illustrating an example of a configuration of a virtual class 40. The virtual class 40 includes entries "class ID," "class name," "property," and "installation location" similarly to the individual class 30-1. Here, only a section is provided for the entry "property," and an entry or a data type thereof is not written. A section provided in the entry "property" may be a section having any number and any structure as long as it is a section including at least a data format indicated by definition data of an arbitrary exception IO module. The section including at least a data format indicated by definition data of an arbitrary exception IO module is a section with the number and structure in which entries included in the definition data of the arbitrary exceptional IO module, data types of the entries, and data of sizes corresponding to the data type of the entries can be written and in which the size of an individual section is a size with which any of entries included in the definition data of the arbitrary exceptional IO module, data types of the entries, and data of sizes corresponding to the data type of the entries can be written.

A predetermined class ID of the virtual class 40 is written to a section in which data of the entry "class ID" is recorded. In the example illustrated in FIG. 4, a character string "virtual class" is written as the class ID of the virtual class 40. A predetermined initial name of the class name of the virtual class 40 is written to a section in which data of the entry "class name" is recorded. In the example illustrated in FIG. 4, a character string "virtual class initial name" is written as the initial name of the class name of the virtual class 40. The entry "installation location" has the same data format as the individual class 30-1.

The database unit 11 stores a virtual class-used module name table 50 illustrated in FIG. 5. The virtual class-used module name table 50 stores module names of the exceptional IO modules.

Referring back to FIG. 2, the object data generating unit 12 generates object data in the database unit 11 on the basis of the individual class 30 constructed in the database unit 11 or the virtual class 40. Here, object data that is generated on the basis of the individual class 30-1 illustrated in FIG. 3(*a*) will be described as an example of the object data.

When object data is generated on the basis of the individual class 30-1, the object data generating unit 12 secures a storage area including sections in which data with sizes determined by the data types indicated in the individual class 30-1 is recorded as a storage area in which the entries, the class ID, the module name, and the data type indicated by the individual class 30-1 can be written in the database unit 11. The storage area secured in the database unit 11 by the object data generating unit 12 is the storage area of object data 30-1-1 illustrated in FIG. 3(*b*).

In order to reflect details of the individual class 30-1 in the secured storage area, the object data generating unit 12 copies the entries, the class ID, the module name, and the data format indicated by the individual class 30-1 to the secured storage area in the database unit 11. Accordingly, the object data 30-1-1 not including property data and installation location data is generated. Here, it is assumed that the object data 30-1-1 is object data corresponding to the IO module 151 which is inserted into the slot 143-1 of the IO node 140, and the IO module 151 is used, for example, as a pressure sensor. In this case, property data when the IO module 151 is used as a pressure sensor is given to the object data generating unit 12.

The object data generating unit 12 writes the given property data to sections in which data of the entries of "fail action," "communication Timeout time (ms)," "signal range upper limit (mA)," and "signal range lower limit (mA)" in the corresponding object data 30-1-1 are recorded. In the example illustrated in FIG. 3(*b*), "0 input," "30," "20," and "4" are written as the property data corresponding to the entries "fail action," "communication Timeout time (ms)," "signal range upper limit (mA)," and "signal range lower limit (mA)."

Installation location data indicating a location into which the IO module 151 is inserted is given to the object data generating unit 12. Installation location data includes identification data corresponding to the entries "Net," "Node," and "Slot." Here, it is assumed that the identification data corresponding to the ring network 130 is 1," the identification data corresponding to the IO node 140 is "32," and the identification data corresponding to the slot 143-1 into which the IO module 151 is inserted is "1." In this case, the object data generating unit 12 writes the identification data included in the given installation location data to the sections in which data of the entries "Net," "Node," and "Slot" of the object data 30-1-1 corresponding to the identification data is recorded. Accordingly, the object data 30-1-1 illustrated in FIG. 3(*b*) which is object data corresponding to the IO module 151 inserted into the slot 143-1 of the IO node 140 in FIG. 1 is generated in the database unit 11.

On the other hand, for example, it is assumed that the IO module 151 used as a temperature sensor is inserted into the slot 143-5 in an empty state of the IO node 140. In this case, the object data generating unit 12 secures a storage area in the database unit 11, reflects details of the individual class 30-1 in the secured storage area, and generates object data 30-1-2 illustrated in FIG. 3(*c*) in the same sequence as the object data 30-1-1. Property data when the IO module 151 is used as a temperature sensor and installation location data are given to the object data generating unit 12.

The object data generating unit 12 writes the property data when the IO module 151 is used as a temperature sensor to sections in which data of the entries "fail action," "communication Timeout time (ms)," "signal range upper limit (mA)," and "signal range lower limit (mA)" of the object data 30-1-2 corresponding thereto are recorded. In the example illustrated in FIG. 3(*c*), "retention," "30," "20," and "4" are written as the property data corresponding to the "fail action," "communication Timeout time (ms)," "signal range upper limit (mA)," and "signal range lower limit (mA)."

The object data generating unit 12 writes data included in the given installation location data to sections in which data of the entries "Net," "Node," and "Slot" of the object data 30-1-2 corresponding thereto are recorded. It is assumed that the identification data corresponding to the slot 143-5 is "5." Accordingly, the object data 30-1-2 illustrated in FIG. 3(*c*) which is object data corresponding to the IO module 151 which is inserted into the slot 143-5 of the IO node 140 is generated in the database unit 11.

That is, object data is data corresponding to the IO modules 150 actually installed in the control system 100 in a one-to-one manner, and different object data is generated when the IO modules 150 of the same type have different usage or different installation locations.

Referring back to FIG. 2, the definition data storage unit 13 stores definition data of the exceptional IO modules manufactured by company B. FIG. 6 is a diagram illustrating an example of definition data 60 of an IO module 153 which is an exception IO module manufactured by company B. As described above, it is assumed that the operator of the control system 100 and company B have not arranged provision of definition data in advance similarly to company A and have arranged provision of definition data as text data of a common format from company B.

The common format is, for example, a data format in which a file name is a module name and subentries of the entry "property" and data types corresponding to the subentries are alternately divided by commas in the file as illustrated in FIG. 6. The IO module 153 includes 16 channels as indicated by the file name, and upper and lower limits of communication in addition to upper and lower limits of a signal range can be determined for each channel. Accordingly, the definition data 60 is data including 16 entries of "signal range upper limit (mA)," "signal range lower limit (mA)," "communication data upper limit (byte)," and "communication range lower limit (byte)" and 16 data types corresponding to the entries.

In the example illustrated in FIG. 6, the definition data 60 can be represented in one table, but when a data format is represented by a plurality of tables, for example, the definition data 60 may include a plurality of files corresponding to the tables. In this case, for example, each file includes details for identifying a data format of the definition data 60 such as a table name and data indicating a relationship between tables.

Referring back to FIG. 2, the operation unit 14 includes, for example, an input device such as a mouse or a keyboard and is operated by an operator of the engineering device 10. The display unit 15 is, for example, a liquid crystal display and displays data output from the display processing unit 16.

The display processing unit 16 receives various instruction signals from the operation unit 14, reads data based on the instruction signals from the database unit 11, displays the data on the display unit 15, or outputs an instruction signal for generating object data to the object data generating unit 12. The output unit 17 is connected to the communication module 111 of the control device 110 via a LAN or the like. The output unit 17 read system configuration data of the control system 100 from the database unit 11 and transmits the read system configuration data to the control device 110. The definition data acquiring unit 18 acquires definition data 60 provided from the outside, writes a file name of the acquired definition data 60 to the virtual class-used module name table 50 of the database unit 11, and writes the acquired definition data 60 to the definition data storage unit 13.

(Operation Example of Engineering Device)

Figure 7:
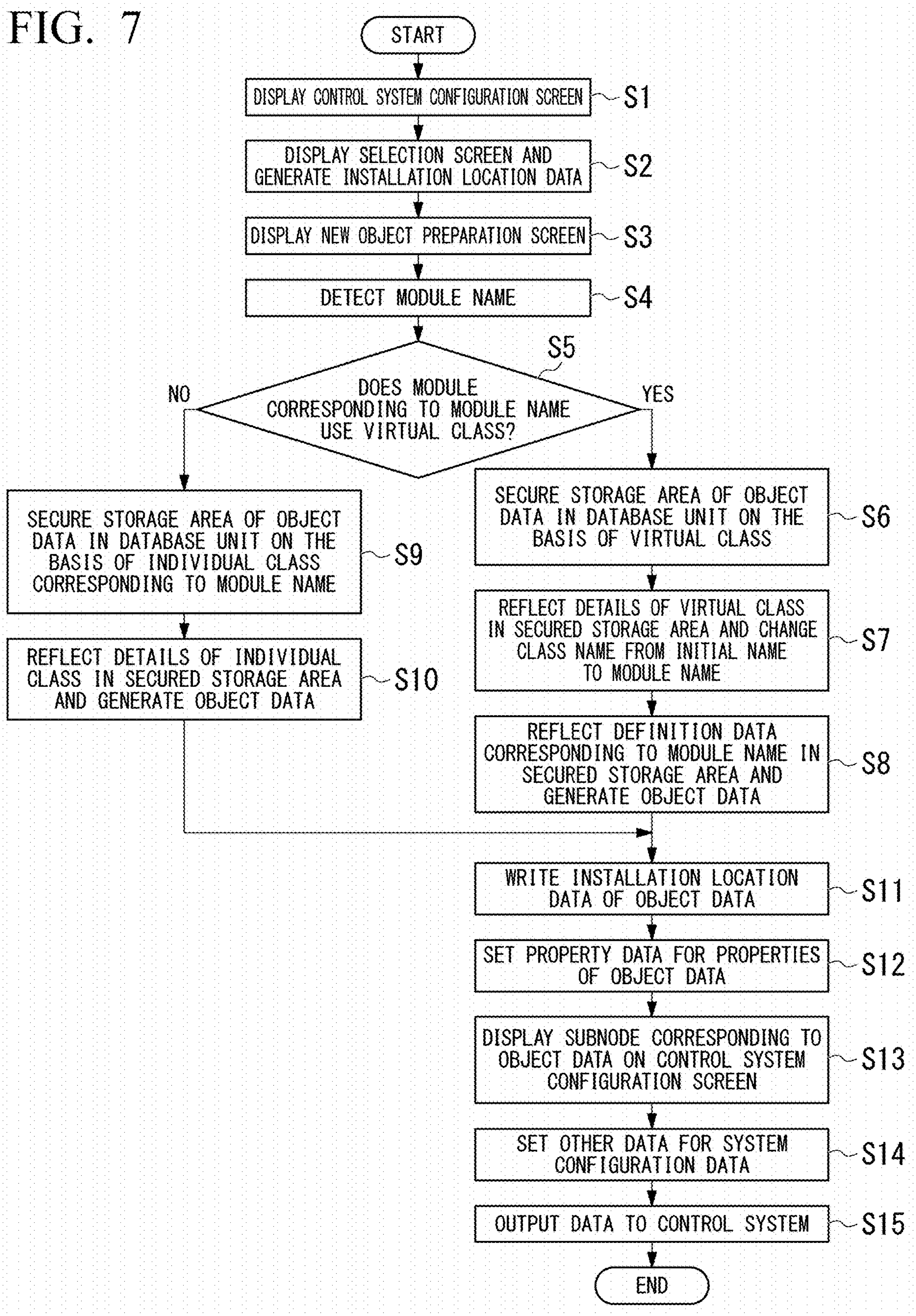
FIG. 7 is a flowchart illustrating an example of an operation flow that is performed by the engineering device according to the embodiment of the present disclosure.

FIG. 7 is a flowchart illustrating an example of an operation flow that is performed in the engineering device 10. Before the process flow of the flowchart illustrated in FIG. 7 is started, it is assumed that the control system 100 is configured as follows. It is assumed that the IO module 151 is inserted into the slot 143-1 of the IO node 140 of the control system 100, the IO module 152 is inserted into the slot 143-2, and the other slots 143-3 to 143-8 are empty. It is also assumed that object data of the two IO modules 151 and 152 is generated in advance in the database unit 11 and property data and installation location data are written to each of the generated object data.

It is assumed that definition data 60 of the IO module 153 has been acquired and the acquired definition data 60 is supplied to the definition data acquiring unit 18. Accordingly, the definition data storage unit 13 stores the definition data 60. The virtual class-used module name table 50 of the database unit 11 stores "AI AI ch. 16 4-20 mA manufactured by company B" which is a module name of the IO module 153 indicated by the file name of the definition data 60.

In the configuration of the control system 100, the IO module 153 which is an exceptional IO module is inserted into the slot 143-3 which is empty, and the operation flow illustrated in FIG. 7 is started in the engineering device 10.

The display processing unit 16 of the engineering device 10 displays a menu screen in which various processes are represented by options when the engineering device 10 starts on the display unit 15. The operator performs an operation of selecting an option of an operation of displaying the system configuration data of the control system 100 in a tree structure on the menu screen on the operation unit 14.

When the operation is performed, the operation unit 14 outputs an operation instruction signal to the display processing unit 16. When the operation instruction signal is received, the display processing unit 16 detects that the option of the operation of displaying the system configuration data of the control system 100 in a tree structure is selected by the operation unit 14 on the menu screen. The display processing unit 16 reads the system configuration data of the control system 100 from the database unit 11. The display processing unit 16 generates a control system configuration screen 200 illustrated in FIG. 8 in which the read system configuration data is displayed in a tree structure. The display processing unit 16 displays the generated control system configuration screen 200 on the display unit 15 (S1).

Figure 8:
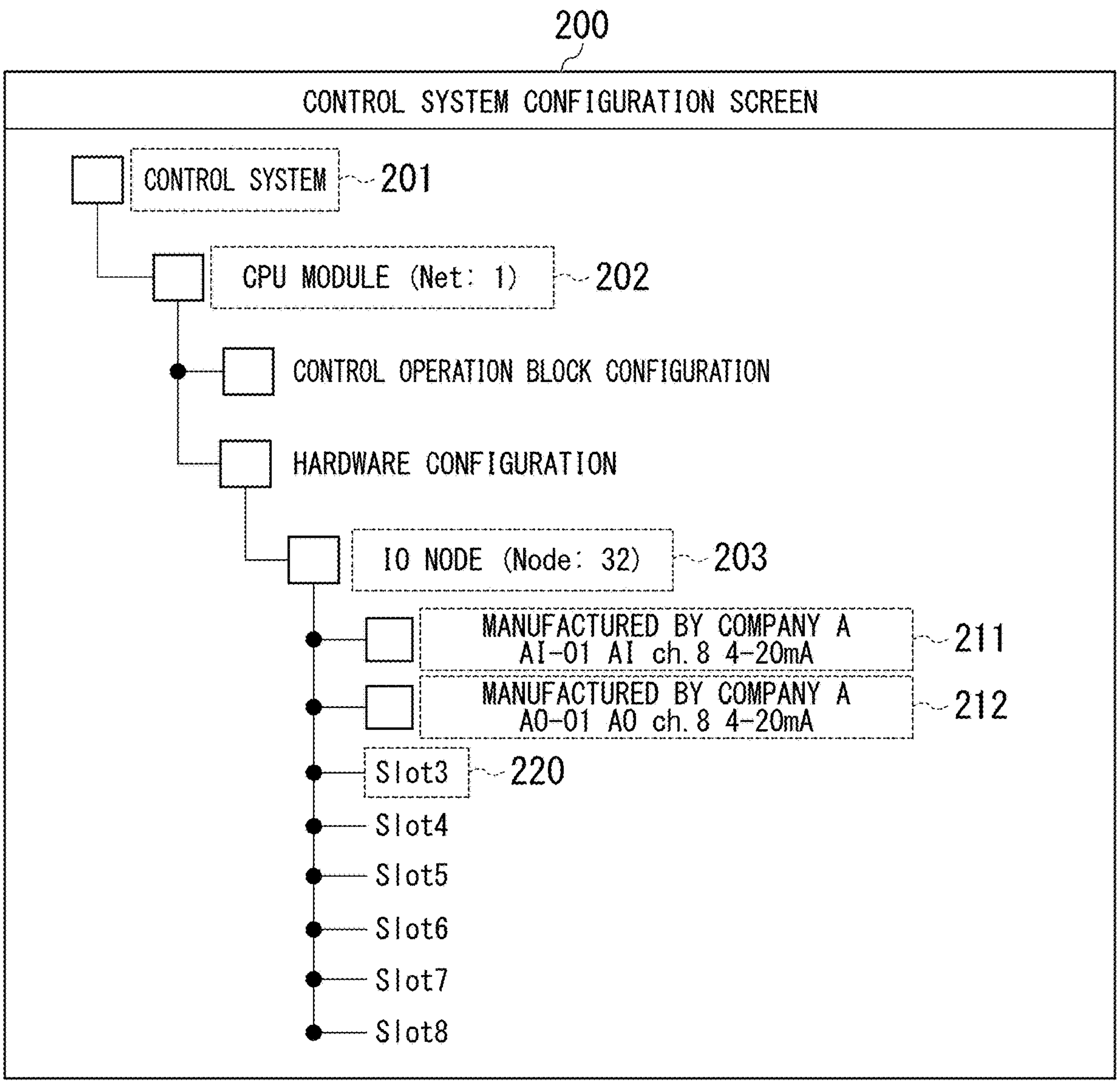
FIG. 8 is a diagram illustrating an (first) example of a configuration of a control system configuration screen according to an embodiment of the present disclosure.

In the control system configuration screen 200 illustrated in FIG. 8, a root node 201 including a character string "control system" represents the control system 100. A subnode 202 including a character string "CPU module (Net: 1)" indicating the CPU module 115 is displayed as a subnode of the root node 201. "Control operation block configuration" and "hardware configuration" are displayed as subnodes of the subnode 202, and a subnode 203 including a character string "IO node (Node: 32)" indicating the IO node 140 is displayed as a subnode of "hardware configuration."

The subnode 203 includes 8 subnodes corresponding to the slots 143-1 to 143-8 of the IO node 140. When all the slots 143-1 to 143-8 are empty, the 8 subnodes are represented by names "Slot1" to "Slot8," and sub-numbers of reference signs of the slots 143-1 to 143-8 correspond to numerals subsequent to the character string "Slot."

As described above, the IO module 151 is inserted into the slot 143-1 corresponding to "Slot1," the IO module 152 is inserted into the slot 143-2 corresponding to "Slot2," and object data corresponding thereto is generated. Accordingly, a character string "AI-01 AI ch. 8 4-20 mA manufactured by company A" which is a module name of the IO module 151 is displayed instead of "Slot1" at a position of a subnode 211 corresponding to the slot 143-1. A character string "AO-01 AO ch. 8 4-20 mA manufactured by company A" which is a module name of the IO module 152 is displayed instead of "Slot2" at a position of a subnode 212 corresponding to the slot 143-2. AO is an abbreviation to analog output.

Figure 9:
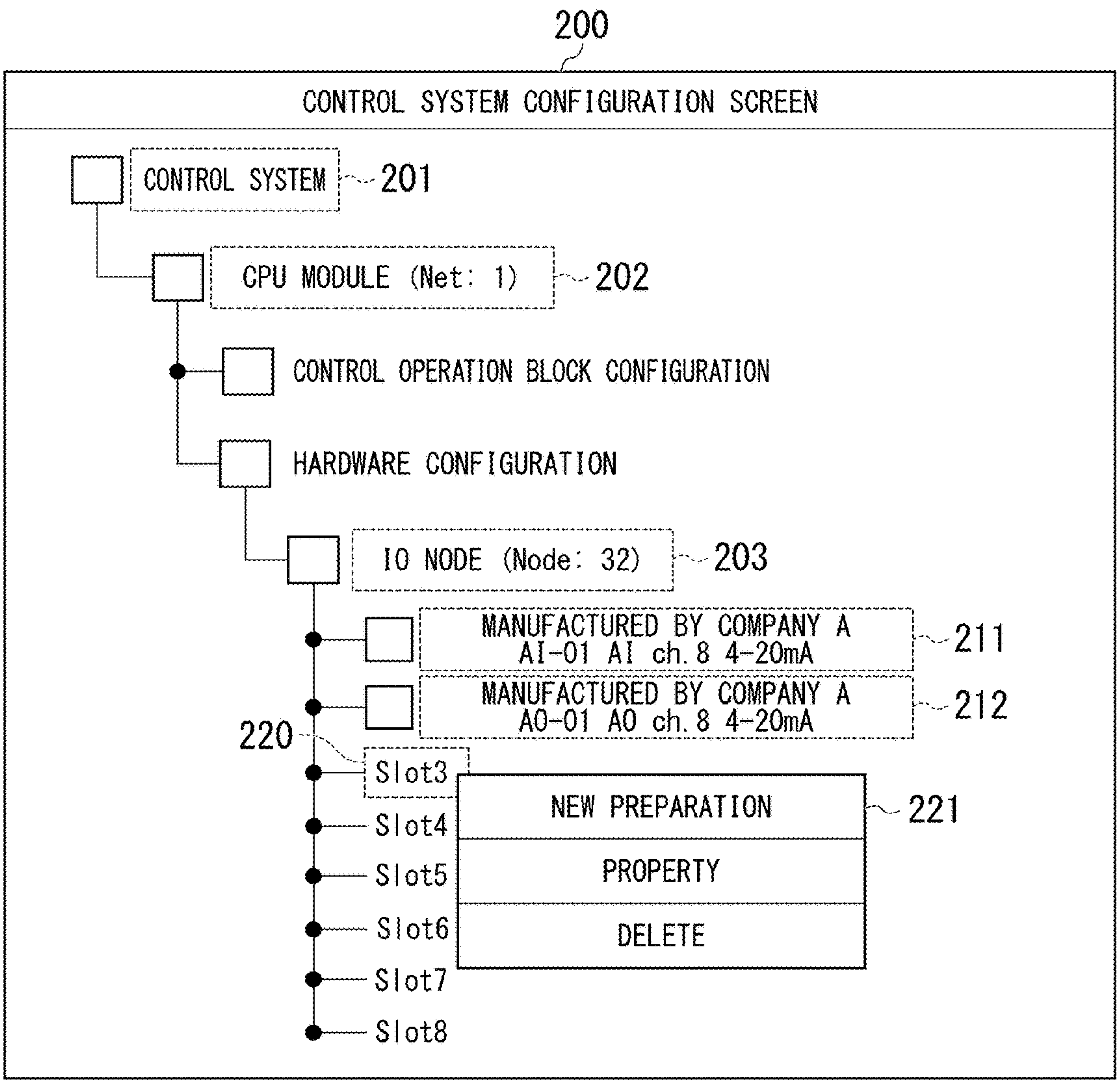
FIG. 9 is a diagram illustrating an (second) example of the configuration of the control system configuration screen according to the embodiment of the present disclosure.

The operator performs an operation of selecting an area in which a subnode 220 including the character string "Slot3" corresponding to the slot 143-3 inserted into the IO module 153 is displayed on the control system configuration screen 200 on the operation unit 14. When the operation is performed, the operation unit 14 outputs an operation instruction signal to the display processing unit 16. When the operation instruction signal is received, the display processing unit 16 detects the subnode 220 in the area selected by the operation unit 14. The display processing unit 16 generates a selection screen 221 in correlation with information indicating the detected subnode 220. The display processing unit 16 displays the generated selection screen 221 near the area in which the subnode 220 is displayed as illustrated in FIG. 9. The selection screen 221 includes three options of "new preparation," "property," and "delete." Here, the operator performs an operation of selecting the option "new preparation" on the operation unit 14. When the operation is performed, the operation unit 14 outputs an operation instruction signal to the display processing unit 16.

When the operation instruction signal is received in a state in which the selection screen 221 correlating information indicating the subnode 220 is displayed on the display unit 15, the display processing unit 16 detects that the option "new preparation" on the selection screen 221 is selected by the operation unit 14. When the option "new preparation" is detected, the display processing unit 16 detects "3" as identification data corresponding to "Slot" from information indicating the subnode 220 correlated with the selection screen 221 which is being displayed. The display processing unit 16 detects identification data "32" corresponding to "Node" and identification data "1" corresponding to "Net" from the subnodes 203 and 202 present in a route from the subnode 220 to the root node 201. The display processing unit 16 generates "Net: 1, Node: 32, Slot: 3" which is installation location data from the detected three pieces of identification data (S2).

When the installation location data is generated, the display processing unit 16 detects class IDs stored in correlation with the entry "class ID" of all the individual classes 30 and module names stored in correlation with the entry "class name" from the database unit 11. The display processing unit 16 correlates the corresponding class IDs with the detected module names and generates combinations of a module name and a class ID.

The display processing unit 16 reads all the module names stored in the virtual class-used module name table 50 of the database unit 11 and correlates the read module names with the entry "virtual class" which is the class ID of the virtual class 40.

Figure 10:
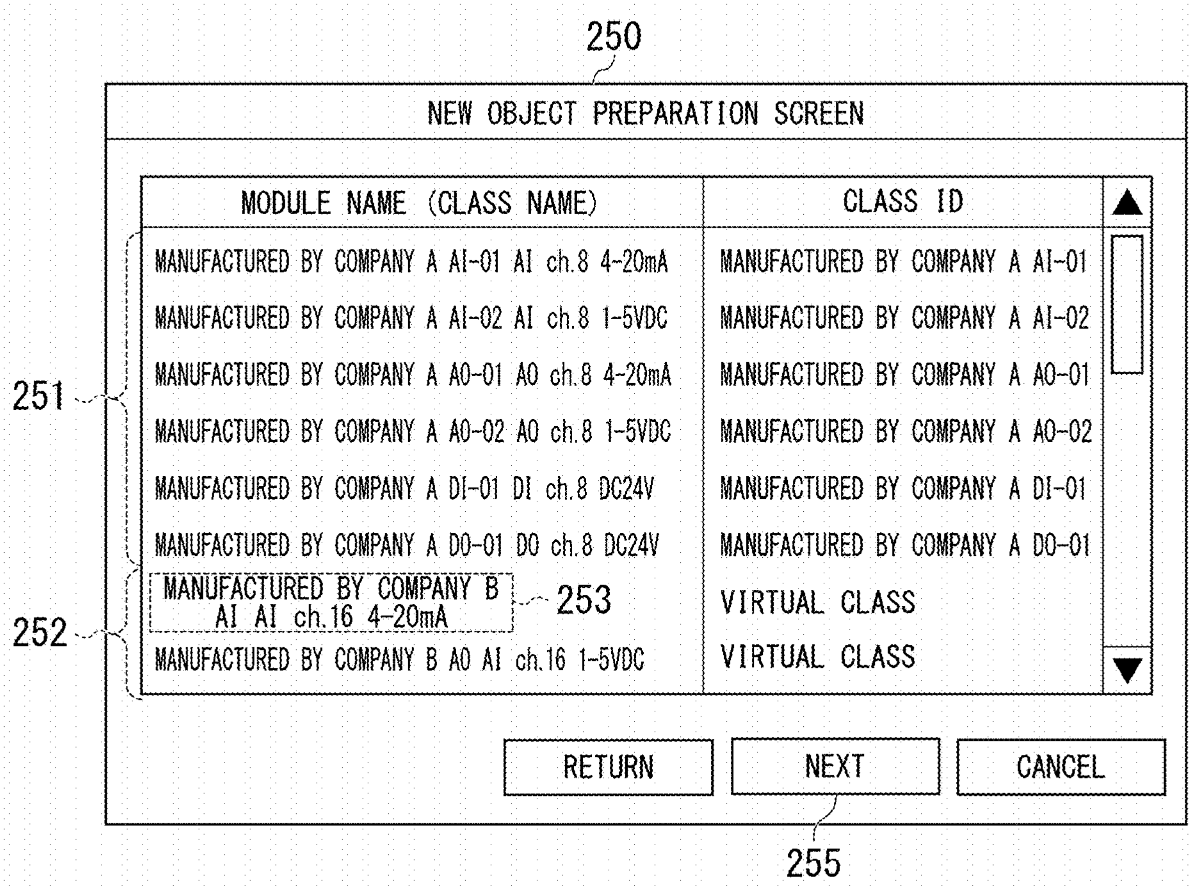
FIG. 10 is a diagram illustrating an example of a configuration of a new object preparation screen according to an embodiment of the present disclosure.

The display processing unit 16 generates a new object preparation screen 250 illustrated in FIG. 10 in which the combinations of a module name and a class ID generated for all the individual classes 30 and the module names in which "virtual class" is correlated as the class ID are in a list. The display processing unit 16 displays the generated new object preparation screen 250 on the display unit 15 (S3). In FIG. 10, for example, the new object preparation screen 250 including 6 module names detected from the individual classes 30 corresponding to normal IO modules referred to by reference sign 251, a combination of the class IDs, a combination of two module names corresponding to exceptional IO modules referred to by reference sign 252 and "virtual class" which is the class ID of the virtual class 40 is illustrated.

The operator performs an operation of selecting "AI AI ch. 16 4-20 mA manufactured by company B" referred to by reference sign 253 which is a module name corresponding to the IO module 153 on the new object preparation screen 250 on the operation unit 14. When the operation is performed, the operation unit 14 outputs an operation instruction signal to the display processing unit 16. When the operation instruction signal is received, the display processing unit 16 detects "AI AI ch. 16 4-20 mA manufactured by company B" which is the module name selected by the operation unit 14 on the new object preparation screen 250.

The operator performs an operation of selecting a button 255 including a character string "next" on the new object preparation screen 250 on the operation unit 14. When the operation is performed, the operation unit 14 outputs an operation instruction signal to the display processing unit 16. When the operation instruction signal is received, the display processing unit 16 detects that the button 255 on the new object preparation screen 250 is selected by the operation unit 14 and deletes the new object preparation screen 250 from the display unit 15 (S4).

The display processing unit 16 outputs the installation location data generated in the operation of S2 and the module name detected in the operation of S4 to the object data generating unit 12. The object data generating unit 12 acquires the installation location data and the module name output from the display processing unit 16. The object data generating unit 12 determines whether the acquired module name is a module name of the IO module 150 using the virtual class 40 on the basis of whether the acquired module name is stored in the virtual class-used module name table 50 of the database unit 11 (S5).

Here, the module name "AI AI ch. 16 4-20 mA manufactured by company B" acquired by the object data generating unit 12 is stored in the virtual class-used module name table 50. Accordingly, the object data generating unit 12 determines that the acquired module name is the module name of the IO module 150 using the virtual class 40, that is, an exceptional IO module (S5: YES). In this case, the object data generating unit 12 secures a storage area which will be described below in the database unit 11 according to the virtual class 40 stored in the database unit 11.

The object data generating unit 12 secures a storage area in which data with a size determined on the basis of details indicated by the virtual class 40 and the data types of "Net," "Node," and "Slot" can be written and which is a storage area of sections provided for the entry "property" in the database unit 11. The storage area secured in the database unit 11 is a storage area of object data 40-1 illustrated in FIG. 12 corresponding to the IO module 153 inserted into the slot 143-3 of the IO node 140 of the control system 100 (S6).

In order to reflect details of the virtual class 40 in the secured storage area, the object data generating unit 12 copies the entries "class ID," "class name," "property," "installation location," "Net," "Node," and "Slot" of the virtual class 40, "virtual class" which is a class ID, "virtual class initial name" which is an initial name of the class name of the virtual class 40, and the data types of "Net," "Node," and "Slot" to the secured storage area in the database unit 11. The object data generating unit 12 replaces "virtual class initial name" which is data corresponding to the entry "class name" with "AI AI ch. 16 4-20 mA manufactured by company B" which is the acquired module name (S7).

The object data generating unit 12 reads definition data 60 corresponding to "AI AI ch. 16 4-20 mA manufactured by company B" which is the acquired module name from the definition data storage unit 13. The object data generating unit 12 generates object data 40-1 by reflecting the read definition data 60 in the secured storage area. That is, the object data generating unit 12 writes the entries indicated by the definition data 60 and the data types to a section provided in the entry "property" in the secured storage area according to the data type indicated by the definition data 60. Accordingly, the object data 40-1 in which property data and installation location data are not included is generated (S8).

The object data generating unit 12 writes three numerical values indicated by "Net: 1, Node: 32, Slot: 3" which is the installation location data acquired in the operation of S5 to the sections in which data of the entries "Net," "Node," and "Slot" of the corresponding object data 40-1 is recorded (S11).

The object data generating unit 12 outputs an instruction signal for displaying a property setting screen including information for identifying the object data 40-1 to the display processing unit 16. Here, the information for identifying the object data 40-1 is, for example, "virtual class" which is the class ID, the class name "AI AI ch. 16 4-20 mA manufactured by company B," and the installation location data included in the object data 40-1.

Figure 11:
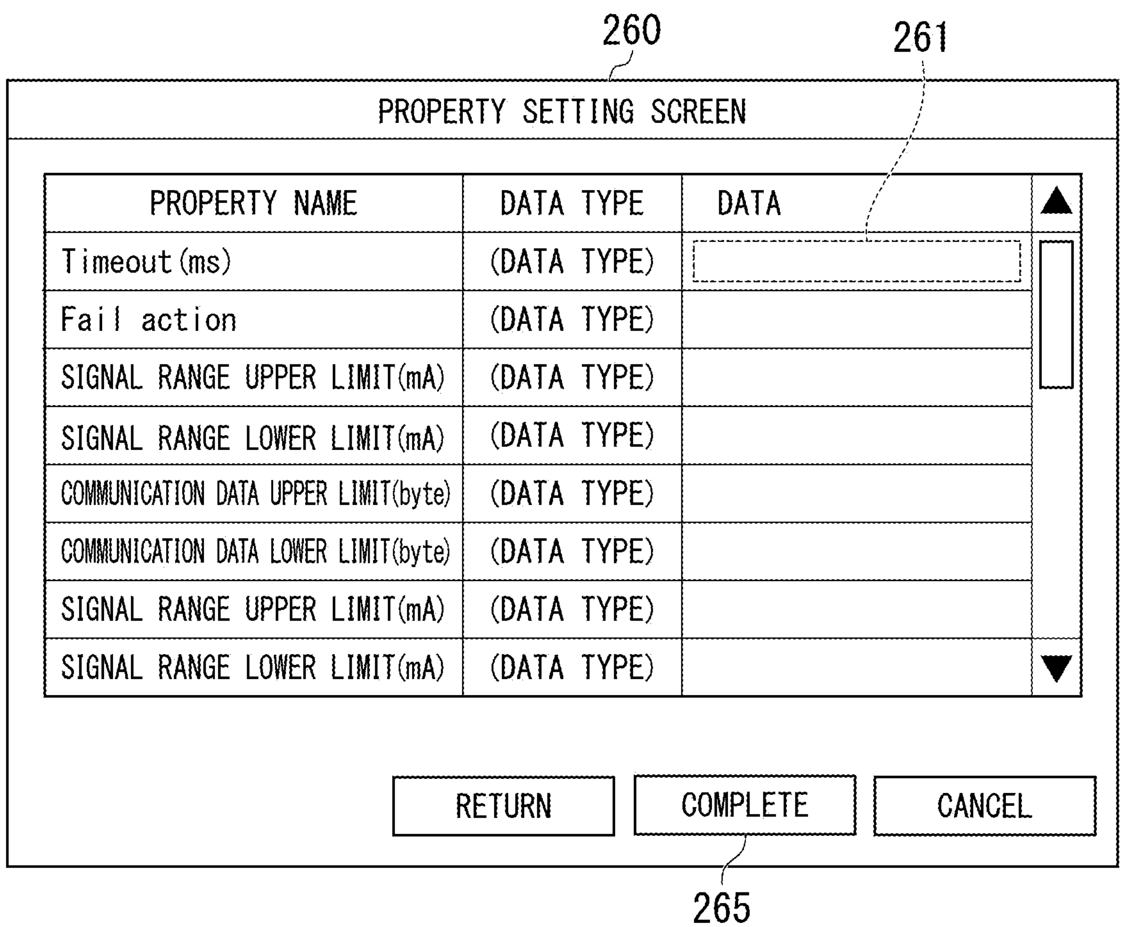
FIG. 11 is a diagram illustrating an example of a configuration of a property setting screen according to an embodiment of the present disclosure.

When the instruction signal is received, the display processing unit 16 reads subentries included in the entry "property" of the object data 40-1 data types corresponding to the subentries from the database unit 11 on the basis of the information for identifying the object data 40-1, which is included in the instruction signal. The display processing unit 16 generates a property setting screen 260 illustrated in FIG. 11 indicating the read subentries and the read data types. The display processing unit 16 displays the generated property setting screen 260 on the display unit 15.

On the property setting screen 260 displayed on the display unit 15, property data for each of entries "Timeout (ms)," "Fail action," and "signal range upper limit (mA)," "signal range lower limit (mA)," "communication data upper limit (byte)," and "communication range lower limit (byte)" corresponding to 16 channels is set through the operator's operation on the operation unit 14. For example, a case in which property data of the entry "Timeout (ms)" is set will be described. When the operator performs an operation of selecting a section 261 in the first row corresponding to the entry "Timeout (ms)" in the column of the entry "data" on the operation unit 14, the display processing unit 16 sets the section 261 to a settable state. When the operator performs an operation of writing the property data "30" corresponding to the entry "Timeout (ms)" in the section 261 set to the settable state on the operation unit 14, the display processing unit 16 displays the written property data "30" in the section 261.

When setting of the property data is completed, the operator performs an operation of selecting a button 265 including a character string "completion" on the property setting screen 260 on the operation unit 14. When the operation is performed, the operation unit 14 outputs an operation instruction signal to the display processing unit 16. When the operation instruction signal is received, the display processing unit 16 detects that the button 265 on the property setting screen 260 is selected by the operation unit 14. The display processing unit 16 outputs an instruction signal for instructing to write property data including data in which the property data displayed on the property setting screen 260 is correlated with the corresponding entries and information for identifying the object data 40-1 to the object data generating unit 12. The display processing unit 16 deletes the property setting screen 260 from the display unit 15.

When the instruction signal for instructing to write the property data is received from the display processing unit 16, the object data generating unit 12 detects the object data 40-1 in the database unit 11 on the basis of the information for identifying the object data 40-1 included in the instruction signal. The object data generating unit 12 writes the property data included in the instruction signal to the sections in which data of the entries of the object data 40-1 matching the correlated entries is recorded (S12).

Accordingly, the object data 40-1 stored in the database unit 11 includes details illustrated in FIG. 12. In FIG. 12, the entries "signal range upper limit (mA)," "signal range lower limit (mA)," "communication data upper limit (byte)," and "communication range lower limit (byte)" corresponding to only one channel are illustrated, but the IO module 151 actually includes 16 channels. Accordingly, the entries "signal range upper limit (mA)," "signal range lower limit (mA)," "communication data upper limit (byte)," and "communication range lower limit (byte)" corresponding to 16 channels and property data corresponding to the entries are included in the object data 40-1.

The object data generating unit 12 outputs an instruction signal for updating the control system configuration screen 200 displayed on the display unit 15 to the display processing unit 16. When the instruction signal is received, the display processing unit 16 reads the system configuration data of the control system 100 from the database unit 11. The display processing unit 16 re-generates an image of a part of the tree structure included in the control system configuration screen 200 from the read system configuration data. The display processing unit 16 replaces the image of a part of the tree structure on the control system configuration screen 200 displayed on the display unit 15 with an the re-generated part of the tree structure. Accordingly, the control system configuration screen 200 changes to the state illustrated in FIG. 13, and "AI AI ch. 16 4-20 mA manufactured by company B" which is the module name of the IO module 153 is displayed instead of "Slot3" of the subnode 220 (S13).

The operator performs an operation of selecting an option of an operation of setting other data in the system configuration data on the menu screen displayed on the display unit 15 on the operation unit 14. When the operation is performed, the operation unit 14 outputs an operation instruction signal to the display processing unit 16. When the operation instruction signal is received, the display processing unit 16 detects that the option of the operation of setting other data on the menu screen is selected by the operation unit 14. The display processing unit 16 generates a screen for setting other data and displays the screen on the display unit 15.

On the screen for setting other data, the operator performs an operation of setting other data on the operation unit 14. Accordingly, the display processing unit 16 receives an operation instruction signal for each operation from the operation unit 14 and updates the system configuration data of the control system 100 stored in the database unit 11 on the basis of the other data set on the screen for setting other data. When updating of the system configuration data is completed, the display processing unit 16 deletes the screen for setting other data from the display unit 15 (S14). Here, the other data is, for example, data indicating an arithmetic operation of calculating an amount of drive of the actuator 162 or the like on the basis of a numerical value measured by the sensor 163 and acquired by the newly added IO module 153 and a numeral value measured by the sensor 161 and acquired by the IO module 151.

The operator performs an operation of selecting an option of an operation of outputting the system configuration data to the control device 110 on the menu screen displayed on the display unit 15 on the operation unit 14. When the operation is performed, the operation unit 14 outputs an operation instruction signal to the display processing unit 16. When the operation instruction signal is received, the display processing unit 16 detects that the option of the operation of outputting the system configuration data to the control device 110 on the menu screen is selected by the operation unit 14. The display processing unit 16 outputs an instruction signal for outputting the system configuration data of the control system 100 stored in the database unit 11 to the control device 110 to the output unit 17. When the instruction signal is received, the output unit 17 reads the system configuration data of the control system 100 from the database unit 11 and transmits the read system configuration data to the communication module 111 of the control device 110 (S15).

The communication module 111 outputs the system configuration data transmitted from the output unit 17 to the CPU module 115. The CPU module 115 acquires the system configuration data output from the communication module 111 and replaces the system configuration data of the control system 100 stored in an internal storage area with the acquired system configuration data. Accordingly, the IO module 153 inserted into the slot 143-3 of the IO node 140 operates normally.

In the operation of S5, the case in which the object data generating unit 12 determines that the acquired module name is not an IO module 150 using the virtual class 40 (S5: NO) includes the following case. That is, such a case includes a case in which the acquired module name is not stored in the virtual class-used module name table 50 of the database unit 11 and the IO module 150 corresponding to the module name is a normal IO module.

In this case, the object data generating unit 12 detects an individual class 30 including the module name to be processed in the entry "class name" from the database unit 11. The object data generating unit 12 secures a storage area of the object data in the database unit 11 on the basis of the detected individual class 30 (S9). The object data generating unit 12 generates object data by reflecting details of the detected individual class 30 in the secured storage area in the database unit 11 (S10). Thereafter, the operation of S11 or the operations subsequent thereto are performed. The subnode 211 corresponding to the IO module 151 inserted into the slot 143-1 illustrated in FIG. 8 and the subnode 212 corresponding to the IO module 152 inserted into the slot 143-2 are displayed through the operations of S9 and S10.

Figure 13:
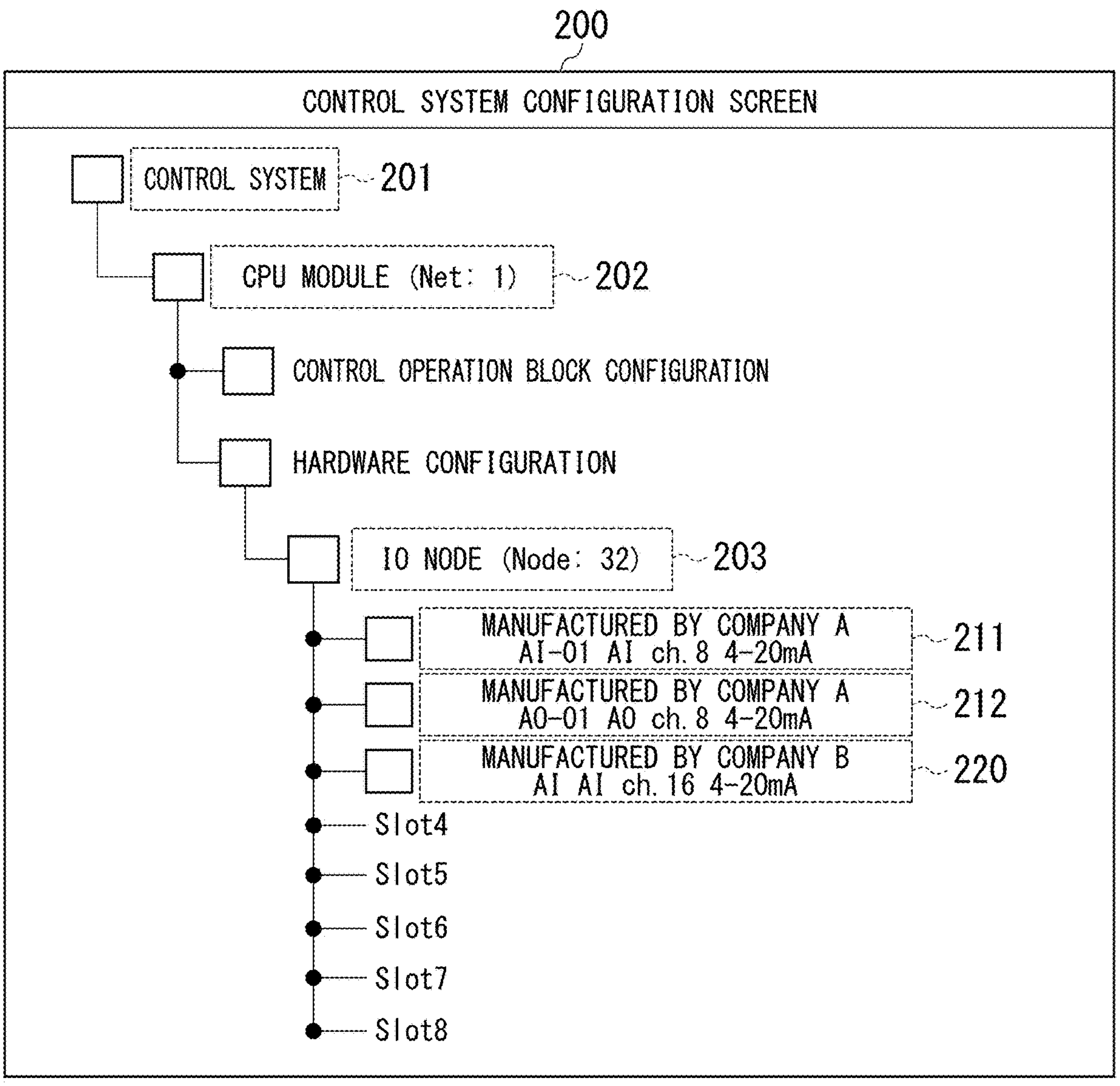
FIG. 13 is a diagram illustrating an (third) example of the configuration of the control system configuration screen according to the embodiment of the present disclosure.

After the control system configuration screen 200 illustrated in FIG. 13 is displayed through the operation of S13, the operator may add or correct property data by performing the following operation. That is, on the control system configuration screen 200 illustrated in FIG. 13, the operator performs an operation of displaying the selection screen 221 displayed in the operation of S2 on the display unit 15 on the operation unit 14. On the selection screen 221 displayed through this operation, the operator displays the property setting screen 260 illustrated in FIG. 11 on the display unit 15 again by performing the operation of selecting the option "property" on the operation unit 14. On the property setting screen 260, the operator can add or correct the property data.

(Functions and Advantages)

In the engineering device 10 according to this embodiment, the virtual class 40 is constructed in advance in the database unit 11. Thereafter, when definition data 60 of an exceptional IO module is acquired, the acquired definition data 60 is sent to the definition data acquiring unit 18, a module name of the exceptional IO module given as a file name of the definition data 60 is written to the virtual class-used module name table 50 of the database unit 11, and the definition data 60 is written to the definition data storage unit 13. Accordingly, the exception IO module can be selected in the engineering device 10 similarly to a normal IO module, and object data of the exception IO module can be generated in the database unit 11 using the virtual class 40.

Since the virtual class 40 can be constructed in advance in the database unit 11, an operation required for setting an exceptional IO module to a settable state in the engineering device 10 includes only an operation of sending definition data 60 to the definition data acquiring unit 18 when the definition data 60 of the exception IO module is acquired. Time required for this operation is much shorter than time required for constructing an individual class 30 on the basis of the definition data 60 in the database unit 11. Accordingly, by using the engineering device 10, it is possible to shorten a time from a time point at which definition data is acquired to a time point at which an IO module 150 corresponding to the definition data can be used in the control system 100.

When many IO modules 150 manufactured by company A are shipped in a short time, it takes time to construct an individual class 30 in the database unit 11, and thus the individual classes 30 for some IO modules 150 may not be constructed before product shipment. In this case, when definition data of the same common format as the definition data 60 illustrated in FIG. 6 can be acquired from company A, the IO modules 150 of company A of which definition data of the common format can be acquired can be handled as an exceptional IO module, and the IO modules 150 can be set to a settable state in the engineering device 10 before product shipment using the virtual class 40.

Other Configuration Examples of Embodiment

While an embodiment of the present disclosure has been described above in detail with reference to the drawings, a specific configuration is not limited to the embodiment and includes design or the like without departing from the gist of the present disclosure.

(Configuration Example Using Virtual Class in Arbitrary Module)

In the aforementioned embodiment, for example, the virtual class 40 is applied to an IO module 150 which is installed in the control system 100. On the other hand, an arbitrary module other than the IO module 150, for example, another type of CPU module when the CPU module 115 can be replaced with the other type of CPU module and definition data of the common format for the other type of CPU module can be acquired, may be handled as an exceptional CPU module, and the exceptional CPU module may be set to a selectable state in the engineering device 10 using the virtual class 40. When other types of modules replaceable are present for arbitrary modules used in the control system 100 such as the communication modules 111, 112, and 141 other than the CPU module 115 and definition data of the common format can be acquired, similarly, the other types of modules may be set to a selectable state in the engineering device 10 using the virtual class 40.

(Configuration Example in Which Module Configuration Data is Copied From Another Engineering Device)

As described above, when an arbitrary module is set to a selectable state in the engineering device 10 using the virtual class 40, for example, the following operations can be performed. In the following description, data generated on the basis of a plurality of pieces of object data out of the system configuration data generated in the database unit 11 by the engineering device 10 is referred to as module configuration data. It is assumed that module configuration data of the control system 100 is generated by another engineering device for generating module configuration data of a format different from that of the module configuration data generated by the engineering device 10. Here, it is assumed that the other engineering device is replaced with the engineering device 10. In this case, the other engineering device performs an operation of selectively reading data corresponding to modules from the module configuration data generated by itself.

The read data corresponding to the modules includes data corresponding to property data and installation location data in addition to module names or entries. In the following description, the data corresponding to the property data and the installation location data is referred to as setting data. The other engineering device converts data corresponding to the modules to definition data which is text data of a common format in which setting data is added to the format of the definition data 60 illustrated in FIG. 6 and three pieces of information of "(entry name)," (data type)," and "(setting data)" are divided and repeated by commas. Since the define data includes installation location data, details such as "Net, (data type), (setting data), Node, (data type), (setting data), Slot, (data type), and (setting data)" are included in the last part. It is assumed that a file name of definition data which is generated through conversion is generated as a module name similarly to the definition data 60.

The definition data of the modules generated as described above is sent to the definition data acquiring unit 18 of the engineering device 10. The definition data acquiring unit 18 writes the sent definition data to the definition data storage unit 13 and writes the file name of the definition data to the virtual class-used module name table 50 of the database unit 11. When writing is completed, the definition data acquiring unit 18 outputs an object data generation instruction signal including the written file name of the definition data to the object data generating unit 12.

When the object data generation instruction signal is received from the definition data acquiring unit 18, the object data generating unit 12 reads the file name of the definition data included in the object data generation instruction signal. The object data generating unit 12 performs the operations of S6 to S8 in FIG. 7 for each of the read file name, that is, for each module name, and also performs a process of writing setting data, that is, property data and installation location data, to the generated object data in the operation of S8. Thereafter, the operation of S13 and operations subsequent thereto are performed.

As long as an operation of starting a process of selectively reading data of modules from the module configuration data is performed in the aforementioned operation, subsequent operations can be performed using another engineering device and the engineering device 10 without using man power. Accordingly, the module configuration data generated in the other engineering device can be copied to the engineering device 10 without using man power.

Here, it is assumed that an engineering device which is mainly used is not the engineering device 10, but another engineering device. In this case, when a new module is added, the other engineering device converts data of the added module to definition data without using man power and sends the definition data to the definition data acquiring unit 18 of the engineering device 10. When the definition data is sent to the definition data acquiring unit 18, the object data generating unit 12 of the engineering device 10 generates object data including property data and installation location data corresponding to the added module in the database unit 11. In this case, the engineering device 10 performs the operation of S13 after generating the object data, and does not perform the operations of S14 and S15 not to compete with system configuration data generated by the other engineering device. Accordingly, since the module configuration data can be stored in two engineering devices, any of the two engineering devices can refer to the latest module configuration data.

(Configuration Example when Module is Replaced)

For example, in order to cope with manufacturing stop of an IO module 151 manufactured by company A, it is assumed that the IO module 151 installed in the control system 100 is replaced with an IO module 153 manufactured by company B and configured to acquire an analog current signal, to convert the analog current signal to a digital signal, and to output the digital signal similarly to the IO module 151. An operator of the engineering device 10 is aware of correspondence between the property data of the IO module 151 and the property data of the IO module 153, prepares a conversion table for converting the property data of the IO module 151 to the property data of the IO module 153, and stores the conversion table in the database unit 11.

In this case, for example, the conversion table is determined such that predetermined values are allocated to the entries "communication data upper limit (byte)" and "communication range lower limit (byte)" which are not included in the property data of the IO module 151 but are included in the property data of the IO module 153. On the other hand, when there is an entry which is included in the property data of the IO module 151 but is not included in the property data of the IO module 153 and there is no problem without using data of the entry, the conversion table is determined such that the data is discarded not to be included after conversion. Here, replacement with an IO module 150 which can take over the whole property data of the IO module 151 is more preferable.

The object data generating unit 12 performs the following operations for each piece of object data corresponding to each IO module 151 installed in the control system 100 and stored in the database unit 11 according to an operator's operation using the operation unit 14 and the display processing unit 16. That is, the object data generating unit 12 converts object data to definition data of the common format corresponding to the IO module 153 using the conversion table stored in the database unit 11.

Here, since the pre-conversion object data includes property data and installation location data, the post-conversion definition data includes the property data and the installation location data. Accordingly, the format of the definition data is text data of a common format in which three entries "(entry name)," "(data type)," and "(setting data)" are divided by commas and repeated similarly to the case of "(configuration example in which module configuration data is copied from another engineering device)." The last part of the definition data includes installation location data in a format "Net, (data type), (setting data), Node, (data type), (setting data), Slot, (data type), (setting data)." Each "(setting data)" is data of the property data corresponding to the corresponding entry or data of the installation location data.

"AI AI ch. 16 4-20 mA manufactured by company B" which is a module name of the replaced IO module 153 is given in advance to the object data generating unit 12 through an operator's operation. The object data generating unit 12 performs the operations of S6 and S7 in FIG. 7, and "virtual class initial name" which is data corresponding to the entry "class name" in the secured storage area is replaced with "AI AI ch. 16 4-20 mA manufactured by company B" in the operation of S7. Thereafter, the object data generating unit 12 performs the operation of S8, and an operation of writing property data and installation location data to the generated object data is also performed in the operation of S8.

When the aforementioned operation on the object data of all the IO modules 151 is completed, the object data generating unit 12 deletes object data corresponding to the IO module 151 installed in the control system 100 from the database unit 11. In the control system 100, the IO module 151 installed in the IO node 140 is replaced with the IO module 153, and then the replaced IO module 153 operates normally by performing the operation of S15 in FIG. 7.

((First) Other Configuration Example of Virtual Class)

In the aforementioned embodiment, sections having a number and a structure in which entries included in definition data of an arbitrary exceptional IO module, a data type for each entry, and data of a size corresponding to the data type for each entry can be written and in which the size of each section is a size with which any of arbitrary entries included in definition data of an arbitrary exceptional IO module, data types corresponding to the arbitrary entries, and data corresponding to the arbitrary entries can be written need to be provided in the entry "property" of the virtual class 40 illustrated in FIG. 4.

On the other hand, sections having a number and a structure in which entries included in definition data of an arbitrary exceptional IO module and a data type for each entry can be written and in which the size of each section is a size with which any of arbitrary entries included in definition data of the arbitrary exceptional IO module and data types corresponding to the arbitrary entries can be written may be merely provided in the entry "property" of the virtual class 40. In other words, a section in which data is recorded may not be provided in advance in the entry "property" of the virtual class 40.

In this case, the object data generating unit 12 secures a storage area to include sections in which data with a size determined for each "(data type)" is recorded with reference to "(data type)" included in the definition data 60 when the storage area of object data is secured in the operation of S6 in FIG. 7. In this way, it is possible to reduce the storage area which is allocated to the virtual class 40 in the database unit 11.

((Second) Configuration Example of Virtual Class)

Unlike the aforementioned embodiment, instead of providing sections in the entry "property" of the virtual class 40 in advance, numerical values indicating the number, structure, and size of sections to be generated for the entry "property" may be predetermined in the virtual class 40 at the time of generating object data of the virtual class 40. In this way, when the object data generating unit 12 secures a storage area of the object data according to the virtual class 40 in the operation of S6 in FIG. 7, a storage area in which sections of a predetermined number, structure, and size can be generated for the entry "property" of the object data may be secured with reference to the numerical values indicating the number, structure, and size of sections to be generated for the entry "property" included in the virtual class 40, and sections of the entry "property" may be generated in the secured storage area. Accordingly, it is possible to reduce the storage area allocated to the virtual class 40 in the database unit 11.

The numerical values indicating the number, structure, and size of sections to be generated for the entry "property" included in the virtual class 40 may be determined without considering the sections in which data is recorded. In this case, the object data generating unit 12 secures a storage area to include sections in which data with a size determined by "(data type)" is recorded as the sections in which data is recorded with reference to "(data type)" of the definition data 60 in the operation of S6.

(Another Configuration Example of Virtual Class-Used Module Name Table)

In the aforementioned embodiment, the database unit 11 stores the virtual class-used module name table 50 illustrated in FIG. 5. On the other hand, the database unit 11 may not store the virtual class-used module name table 50, but may be configured as follows. In the engineering device 10, the display processing unit 16 and the definition data storage unit 13 are connected. The display processing unit 16 reads a module name indicated by a file name of the definition data 60 stored in the definition data storage unit 13 instead of reading the module name from the virtual class-used module name table 50 in the operation of S3 in FIG. 7.

The object data generating unit 12 determines whether the acquired module name matches one of the module names indicted by the file names of the definition data 60 stored in the definition data storage unit 13 instead of determining whether the acquired module name is stored in the virtual class-used module name table 50 of the database unit 11 in the operation of S5 in FIG. 7. In this case, the case in which the object data generating unit 12 determines that the acquired module name matches one corresponds to "YES" in the operation of S5, and the case in which the object data generating unit 12 determines that the acquired module name does not match any corresponds to "NO" in the operation of S5.

The object data generating unit 12 may perform the operation of S5 with reference to the individual class 30 stored in the database unit 11 instead of performing the operation of S5 with reference to the definition data storage unit 13 as described above. That is, the object data generating unit 12 determines whether the acquired module name matches one of the module names indicated by the entry "class name" of the individual classes 30 stored in the database unit 11 in the operation of S5. In this case, the case in which the object data generating unit 12 determines that the acquired module name matches one corresponds to "NO" in the operation of S5, and the case in which the object data generating unit 12 determines that the acquired module name does not match any corresponds to "YES" in the operation of S5.

Other Configuration Examples

In the aforementioned embodiment, as illustrated in FIG. 6, the definition data 60 of the common format corresponding to the exceptional IO module is text data. Since the definition data can be visibly recognized by employing text data, an operator of the control system 100 and company B can easily ascertain conditions of data corresponding to the entries with reference to the definition data 60. Here, the definition data may have any format as long as it is a common format in which the object data generating unit 12 can read individual data included in arbitrary definition data 60, that is, entry names and data types, and may be data other than text data.

In the aforementioned embodiment, the individual class 30, the virtual class 40, and the data format of the definition data 60 include "(data type)." On the other hand, the data formats of the individual class 30, the virtual class 40, and the data format of the definition data 60 may not include "(data type)." When the individual class 30 does not include "(data type)," for example, the data format of the individual class 30 needs to be set to a data format in which sections in which data with a size in which data corresponding to the entries can be written is recorded is provided in advance such that the object data generating unit 12 can secure a storage area including sections in which data is recorded in the operation of S9 in FIG. 7.

On the other hand, even when the virtual class 40 does not include "(data type)," sections in which data corresponding to the entries is recorded are provided in advance in the virtual class 40 as described above, and thus it is possible to secure a storage area of entries and sections in which data is written through the operation of S6 in FIG. 7.

In the aforementioned embodiment, on the new object preparation screen 250 illustrated in FIG. 10, a class ID of an exceptional IO module using the virtual class 40 is displayed as "virtual class." On the other hand, when presence of the virtual class 40 is not displayed to the operator, the display processing unit 16 may perform the following operations. That is, the display processing unit 16 may correlate a part of a read module name instead of correlating "virtual class" which is the class ID of the virtual class 40 whenever a module name stored in the virtual class-used module name table 50 of the database unit 11 is read in the operation of S3 in FIG. 7. For example, when "AI AI ch. 16 4-20 mA manufactured by company B" is read as a module name from the virtual class-used module name table 50, the display processing unit 16 may correlate "AI AI manufactured by company B" which is part thereof with the read module name. Accordingly, on the new object preparation screen 250, "AI AI ch. 16 4-20 mA manufactured by company B" is displayed in the column of "module name (class name)," "AI AI manufactured by company B" is displayed in the column of "class ID" corresponding thereto, and presence of the virtual class 40 is prevented from being displayed to the operator.

(Computer Configuration)

Figure 14:
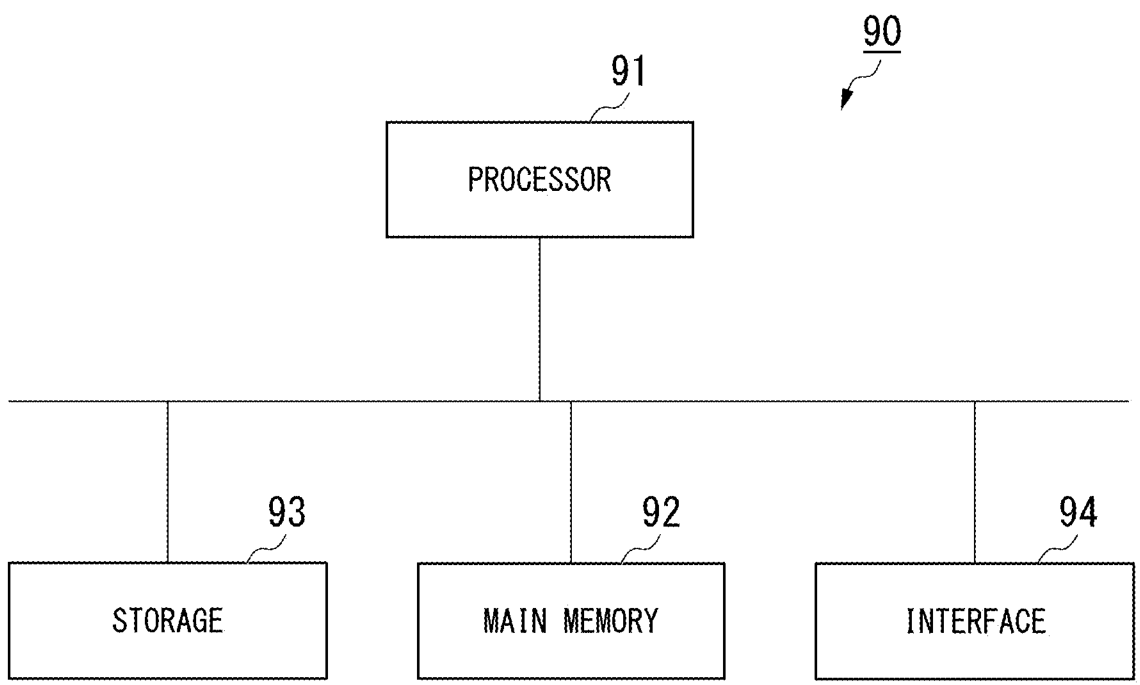
FIG. 14 is a block diagram schematically illustrating a configuration of a computer according to at least one embodiment.

FIG. 14 is a block diagram schematically illustrating a configuration of a computer according to at least one embodiment. A computer 90 includes a processor 91, a main memory 92, a storage 93, and an interface 94. The aforementioned engineering device 10 is installed in the computer 90. The operations of the aforementioned processing units, that is, the database unit 11, the object data generating unit 12, the display processing unit 16, the output unit 17, and the definition data acquiring unit 18, and the operation of a software part of the operation unit 14 are stored in the form of a program in the storage 93. The processor 91 reads a program from the storage 93, loads the program to the main memory 92, and performs the operations in accordance with the program. The processor 91 secures a storage area corresponding to the database unit 11 and the definition data storage unit 13 in the main memory 92 or the storage 93 in accordance with the program. The hardware part of the operation unit 14 (an input device included in the operation unit 14) and the display unit 15 are connected via the interface 94. Accordingly, the hardware part of the operation unit 14 and the display unit 15 may be constituents of the computer 90, that is, constituents of the engineering device 10 as described above, or otherwise.

The program may be for realizing some of the functions which are performed the computer 90. For example, the program may be for realizing the functions in combination with another program stored in advance in the storage 93 or in combination with another program installed in another device. In other embodiments, the computer may include a customized large scale integrated circuit (LSI) such as a programmable logic device (PLD) in addition to the aforementioned constituents or instead of the aforementioned constituents. Examples of PLD include a programmable array logic (PAL), a generic array logic (GAL), a complex programmable logic device (CPLD), and a field-programmable gate array (FPGA). In this case, some or all of the functions realized by the processor may be realized by the integrated circuit.

Examples of the storage 93 include a hard disk drive (HDD), a solid state drive (SSD), a magnetic disk, a magneto-optical disc, a compact disc-read only memory (CD-ROM), a digital versatile disc-read only memory (DVD-ROM), and a semiconductor memory. The storage 93 may be an internal medium directly connected to a bus of the computer 90 or may be an external medium connected to the computer 90 via the interface 94 or a communication line. When the program is transmitted to the computer 90 via a communication line, the computer 90 receiving the program may load the program to the main memory 92 and perform the aforementioned operations. In at least one embodiment, the storage 93 is a non-transitory tangible storage medium.

REMARKS

The engineering device 10 according to the embodiment of the present disclosure can be understood, for example, as follows.

(1) An engineering device 10 according to a first aspect includes: a storage unit (for example, the database unit 11) configured to store a virtual data format (for example, the virtual class 40) which is commonly used by a first type of module (for example, exceptional IO modules such as the IO module 153) in which definition data for defining a module (for example, the IO modules 151, 152, and 153) installed in a control system 100 is provided as data of a predetermined common format; and an object data generating unit 12 configured to secure a storage area in which details of the virtual data format are reflected in the storage unit on the basis of the virtual data format when an installed module is the first type of module, to write entries indicated by the definition data according to the data format indicated by the definition data (for example, the definition data 60) of the installed module to the secured storage area, and to write a module name of the installed module to the secured storage area to generate object data (for example, the object data 40-1). According to this aspect and the following aspects, it is possible to shorten a period of time from a time point at which definition data is acquired to a time point at which a module corresponding to the definition data can be used in the control system.

(2) An engineering device 10 according to a second aspect is the engineering device 10 according to (1), wherein the virtual data format is predetermined to include at least a data format indicated by the definition data of the first type of arbitrary module.

(3) An engineering device 10 according to a third aspect is the engineering device 10 according to (1) or (2), wherein the storage unit stores individual data formats (for example, the individual class 30-1) of a second type of module (for example, normal IO modules such as the IO modules 151 and 152) which is different from the first type of module and in which the individual data formats are determined by the definition data to include module names of the second type of module and entries indicated by the definition data, and wherein the object data generating unit is configured: to determine whether a given module name is a module name of the first type of module or a module name of the second type of module; to secure a storage area in which details of the individual data formats are reflected in the storage unit on the basis of the individual data format corresponding to the given module name and to generate object data (for example, the object data 30-1-1 and 30-1-2) when the given module name is determined to be a module name of the second type of module; and to secure a storage area in which details of the virtual data format are reflected in the storage unit on the basis of the virtual data format when the given module name is determined to be a module name of the first type of module, to write entries indicated by the definition data according to the data format indicated by the definition data of the module corresponding to the given module name to the secured storage area, and to write the given module name to the storage area to generate object data. According to this aspect, when an operator of the engineering device 10 designates only a module name of a module to be installed in the control system 100, it is possible to generate individual object data without recognizing whether the module is a module which is normally used or a module which is exceptionally used to generate object data using the virtual data format.

(4) An engineering device 10 according to a fourth aspect is the engineering device 10 according to any one of (1) to (3), wherein the definition data of the first type of module is provided as text data in the common format. According to this aspect, it is possible to allow a provider of definition data and a user to easily ascertain details of the definition data with reference to the definition data.

(5) An engineering device 10 according to a fifth aspect is the engineering device 10 according to any one of (1) to (4), wherein the first type of module is an IO module or a CPU module.

(6) An engineering device 10 according to a sixth aspect is the engineering device 10 according to any one of (1) to (5), wherein the object data generating unit writes setting data, which is provided through an input operation performed by an operator of the engineering device or provided to be included in the definition data of the first type of module and which includes property data for determining an operation state of the module and installation location data indicating a location at which the module is installed in the control system, to the object data.

(7) An engineering device 10 according to a seventh is the engineering device 10 according to any one of (1) to (6), wherein the definition data of the first type of module is generated to include property data for determining an operation state of the module and installation location data indicating a location at which the module is installed in the control system from module configuration data generated by another engineering device. According to this aspect, it is possible to easily cause another engineering device to transmit the module configuration data to the engineering device 10 or to easily cause both the other engineering device and the engineering device 10 to manage the module configuration data.

(8) An engineering device 10 according to a second aspect is the engineering device 10 according to (3), wherein, when the second type of module in the control system is replaced with the first type of module, the storage unit stores a conversion table indicating a correlation between property data for determining an operation state of the first type of module and property data for determining an operation state of the second type of module, and the object data generating unit converts object data of the second type of module stored in the storage unit, the object data including property data of the second type and installation location data indicating a location at which the second type of module is installed in the control system, to definition data in the common format of the first type of module on the basis of the conversion table, secures a storage area in which details of the virtual data format is reflected in the storage unit on the basis of the virtual data format, writes entries indicated by the definition data, the property data, and the installation location data to the secured storage area according to the data format indicated by the definition data, and writes a module name of the first type of module to be replaced to the storage area to generate object data. According to this aspect, by preparing the conversion table when the second type of module is replaced with the first type of module, object data can be easily transmitted using the virtual data format, and thus it is possible to prevent a human error which may occur when object data is manually rewritten piece by piece.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

1 . . . Plant system
10 . . . Engineering device
11 . . . Database
12 . . . Object data generating unit
13 . . . Definition data storage unit
14 . . . Operation unit
15 . . . Display unit
16 . . . Display processing unit
17 . . . Output unit
100 . . . Control system
110 . . . Control device
111, 112 . . . Communication module
115 . . . CPU module
120 . . . Gateway device
130 . . . Ring network
140 . . . IO node
141 . . . Communication module
142-1 to 142-8 . . . Interface
143-1 to 143-8 . . . Slot
151, 152, 153 . . . IO module
160 . . . Plant
161, 163 . . . Sensor
162 . . . Actuator

The invention claimed is:

1. An engineering device comprising:

a storage unit configured to store a virtual data format which is commonly used by a first type of module in which definition data for defining a module installed in a control system for controlling a plant is provided as data of a predetermined common format;

an object data generating unit configured to secure a storage area in which details of the virtual data format are reflected in the storage unit on the basis of the virtual data format when an installed module is the first type of module, to write entries indicated by the definition data according to the data format indicated by the definition data of the installed module to the secured storage area, and to write a module name of the installed module to the secured storage area to generate object data; and an output unit configured to output system configuration data which is updated using the object data, wherein the storage unit stores individual data formats of a second type of module which is different from the first type of module and in which the individual data formats are determined by the definition data to include module names of the second type of module and entries indicated by the definition data, and wherein the object data generating unit is configured:

to determine whether a given module name is a module name of the first type of module or a module name of the second type of module;

to secure a storage area in which details of the individual data formats are reflected in the storage unit on the basis of the individual data format corresponding to the given module name and to generate object data when the given module name is determined to be a module name of the second type of module; and to secure a storage area in which details of the virtual data format are reflected in the storage unit on the basis of the virtual data format when the given module name is determined to be a module name of the first type of module, to write entries indicated by the definition data according to the data format indicated by the definition data of the module corresponding to the given module name to the secured storage area, and to write the given module name to the storage area to generate object data, and wherein the control system is caused to control the plant by controlling the installed module based on the system configuration data.

2. The engineering device according to claim 1, wherein the virtual data format is predetermined to include at least a data format indicated by the definition data of the first type of arbitrary module.

3. The engineering device according to claim 1, wherein the first type of module is an IO module or a CPU module.

4. The engineering device according to claim 1, wherein the definition data of the first type of module is provided as text data in the common format.

5. The engineering device according to claim 1, wherein the object data generating unit writes setting data, which is provided through an input operation performed by an operator of the engineering device or provided to be included in the definition data of the first type of module and which includes property data for determining an operation state of the module and installation location data indicating a location at which the module is installed in the control system, to the object data.

6. The engineering device according to claim 1, wherein the definition data of the first type of module is generated to include property data for determining an operation state of the module and installation location data indicating a location at which the module is installed in the control system from module configuration data generated by another engineering device.

7. The engineering device according to claim 1, wherein, when the second type of module in the control system is replaced with the first type of module, the storage unit stores a conversion table indicating a correlation between property data for determining an operation state of the first type of module and property data for determining an operation state of the second type of module, and the object data generating unit converts object data of the second type of module stored in the storage unit, the object data including property data of the second type and installation location data indicating a location at which the second type of module is installed in the control system, to definition data in the common format of the first type of module on the basis of the conversion table, secures a storage area in which details of the virtual data format is reflected in the storage unit on the basis of the virtual data format, writes entries indicated by the definition data, the property data, and the installation location data to the secured storage area according to the data format indicated by the definition data, and writes a module name of the first type of module to be replaced to the storage area to generate object data.

8. An object data generation method comprising:

a step of storing a virtual data format which is commonly used by a first type of module in which definition data for defining a module installed in a control system for controlling a plant is provided as data of a predetermined common format in a storage unit;

a step of securing a storage area in which details of the virtual data format are reflected in the storage unit on the basis of the virtual data format when an installed module is the first type of module, writing entries indicated by the definition data according to the data format indicated by the definition data of the installed module to the secured storage area, and writing a module name of the installed module to the secured storage area to generate object data; and a step of outputting system configuration data which is updated using the object data, wherein, the step of storing includes storing individual data formats of a second type of module which is different from the first type of module and in which the individual data formats are determined by the definition data to include module names of the second type of module and entries indicated by the definition data, and wherein the step of securing includes:

determining whether a given module name is a module name of the first type of module or a module name of the second type of module;

securing a storage area in which details of the individual data formats are reflected in the storage unit on the basis of the individual data format corresponding to the given module name and generating object data when the given module name is determined to be a module name of the second type of module; and securing a storage area in which details of the virtual data format are reflected in the storage unit on the basis of the virtual data format when the given module name is determined to be a module name of the first type of module, writing entries indicated by the definition data according to the data format indicated by the definition data of the module corresponding to the given module name to the secured storage area, and writing the given module name to the storage area to generate object data, and wherein the control system is caused to control the plant by controlling the installed module based on the system configuration data.

9. A non-transitory computer-readable recording medium storing a program causing a computer to perform:

a step of storing a virtual data format which is commonly used by a first type of module in which definition data for defining a module installed in a control system for controlling a plant is provided as data of a predetermined common format in a storage unit;

a step of securing a storage area in which details of the virtual data format are reflected in the storage unit on the basis of the virtual data format when an installed module is the first type of module, writing entries indicated by the definition data according to the data format indicated by the definition data of the installed module to the secured storage area, and writing a module name of the installed module to the secured storage area to generate object data; and a step of outputting system configuration data which is updated using the object data, wherein, the step of storing includes storing individual data formats of a second type of module which is different from the first type of module and in which the individual data formats are determined by the definition data to include module names of the second type of module and entries indicated by the definition data, and wherein the step of securing includes:

determining whether a given module name is a module name of the first type of module or a module name of the second type of module;

securing a storage area in which details of the individual data formats are reflected in the storage unit on the basis of the individual data format corresponding to the given module name and generating object data when the given module name is determined to be a module name of the second type of module; and securing a storage area in which details of the virtual data format are reflected in the storage unit on the basis of the virtual data format when the given module name is determined to be a module name of the first type of module, writing entries indicated by the definition data according to the data format indicated by the definition data of the module corresponding to the given module name to the secured storage area, and writing the given module name to the storage area to generate object data, and wherein the control system is caused to control the plant by controlling the installed module based on the system configuration data.

* * * * *